United States Patent
Cho et al.

(10) Patent No.: US 12,509,519 B2
(45) Date of Patent: Dec. 30, 2025

(54) MULTISPECIFIC SINGLE DOMAIN ANTIBODIES CHIMERIC ANTIGEN RECEPTOR AND T-CELL ENGAGER, NUCLEIC ACID, EXPRESSING CELL THEREOF, PHARMACEUTICAL COMPOSITION FOR TREATING CANCER, AND METHOD FOR INHIBITING PROLIFERATION OF TUMOR CELL

(71) Applicant: EVER SUPREME BIO TECHNOLOGY CO., LTD., Taichung (TW)

(72) Inventors: Der-Yang Cho, Taichung (TW);
Shao-Chih Chiu, Taichung (TW);
Shi-Wei Huang, Taichung (TW);
Chih-Ming Pan, Taichung (TW);
Chia-Ing Jan, Taichung (TW);
Mei-Chih Chen, Taichung (TW);
Yu-Chuan Lin, Taichung (TW);
Chung-Chun Wu, Taichung (TW)

(73) Assignee: EVER SUPREME BIO TECHNOLOGY CO., LTD., Taichung (TW)

( * ) Notice: Subject to any disclaimer, the term of this patent is extended or adjusted under 35 U.S.C. 154(b) by 625 days.

(21) Appl. No.: 17/813,681

(22) Filed: Jul. 20, 2022

(65) Prior Publication Data
US 2023/0038878 A1 Feb. 9, 2023

Related U.S. Application Data

(60) Provisional application No. 63/223,985, filed on Jul. 21, 2021.

(51) Int. Cl.
*C07K 16/28* (2006.01)
*A61K 35/17* (2025.01)
(Continued)

(52) U.S. Cl.
CPC .......... *C07K 16/2833* (2013.01); *A61K 35/17* (2013.01); *A61K 39/001102* (2018.08);
(Continued)

(58) Field of Classification Search
None
See application file for complete search history.

(56) References Cited

U.S. PATENT DOCUMENTS

| | | |
|---|---|---|
| 2018/0291114 A1 | 10/2018 | Ostrand-rosenberg et al. |
| 2021/0122825 A1 | 4/2021 | Cho et al. |

FOREIGN PATENT DOCUMENTS

| | | |
|---|---|---|
| CN | 109971713 A | 7/2019 |
| CN | 111989343 A | 11/2020 |

(Continued)

OTHER PUBLICATIONS

Kumar, A. R. et al., "Harnessing the immune system against cancer: current immunotherapy approaches and therapeutic targets", Mol. Biol. Rep., 48(12), doi: 10.1007/s11033-021-06752-9, Oct. 20, 2021, 8075-8095.

(Continued)

*Primary Examiner* — David J Blanchard
(74) *Attorney, Agent, or Firm* — CKC & Partners Co., LLC

(57) ABSTRACT

A multispecific single domain antibodies chimeric antigen receptor and T-cell engager includes an HLA-G single domain antibody chimeric antigen receptor and a bispecific T-cell engager. The HLA-G single domain antibody chimeric antigen receptor includes an HLA-G single domain antibodies unit, a transmembrane domain, and a CD3z signaling domain. The bispecific T-cell engager includes a PD-L1 single domain antibodies unit and a CD3e single domain antibody.

15 Claims, 27 Drawing Sheets

Specification includes a Sequence Listing.

(51) Int. Cl.
*A61K 38/00* (2006.01)
*A61K 39/00* (2006.01)
*A61P 35/00* (2006.01)
*C07K 14/705* (2006.01)
*C07K 14/725* (2006.01)
*C12N 5/0783* (2010.01)

(52) U.S. Cl.
CPC .......... *A61P 35/00* (2018.01); *C07K 14/7051* (2013.01); *C07K 14/70517* (2013.01); *C07K 16/2827* (2013.01); *C12N 5/0636* (2013.01); *C12N 5/0646* (2013.01); *A61K 38/00* (2013.01); *A61K 2039/505* (2013.01); *A61K 2039/5156* (2013.01); *A61K 2039/5158* (2013.01); *C07K 2317/31* (2013.01); *C07K 2317/569* (2013.01); *C07K 2317/76* (2013.01); *C07K 2317/92* (2013.01); *C07K 2319/02* (2013.01); *C07K 2319/03* (2013.01); *C07K 2319/33* (2013.01)

(56) References Cited

FOREIGN PATENT DOCUMENTS

| | | |
|---|---|---|
| EP | 4063395 A1 | 9/2022 |
| JP | 2020516276 A | 6/2020 |
| JP | 2021065219 A | 4/2021 |
| TW | 202012435 A | 4/2020 |
| TW | I717880 B | 2/2021 |
| WO | 2020043899 A1 | 3/2020 |

OTHER PUBLICATIONS

Lowe, K. L. et al., "Novel TCR-based biologics: mobilizing T cells to warm 'cold' tumors", Cancer Treatment Reviews, 77, Jun. 12, 2019, 35-43.

Wang, X. et al., "Chimeric antigen receptor-engineered NK cells: new weapons of cancer immunotherapy with great potential", Exp. Hematol. Oncol., 11(1), Article 85, https://doi.org/10.1186/s40164-022-00341-7, Nov. 2, 2022, 1-19.

Chicaybam, L., et al., "Overhauling CAR T cells to Improve Efficacy, Safety and Cost", Cancers, 12(9), article 2360, doi:10.3390/cancers12092360, 1-26, Aug. 21, 2020.

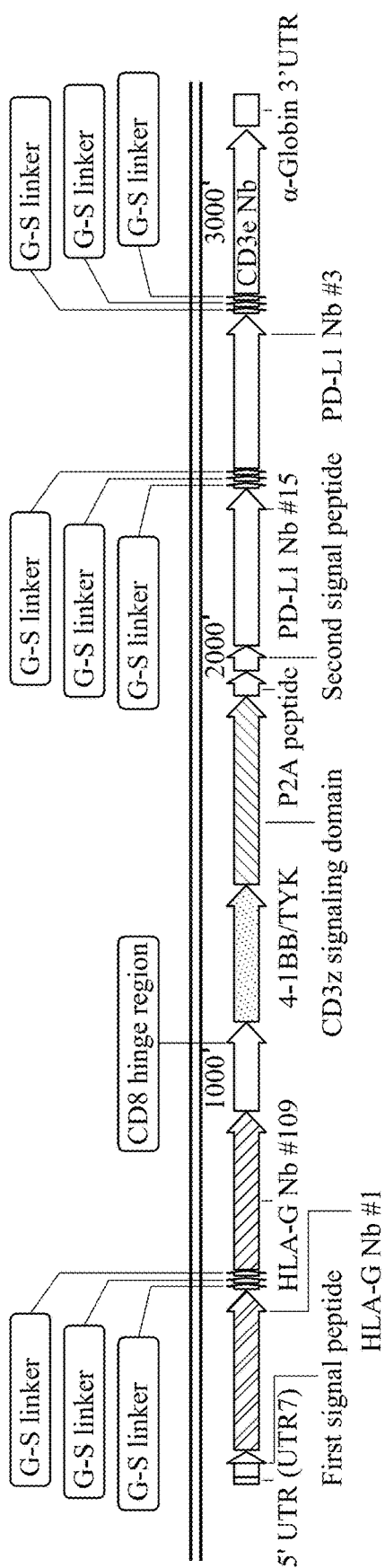
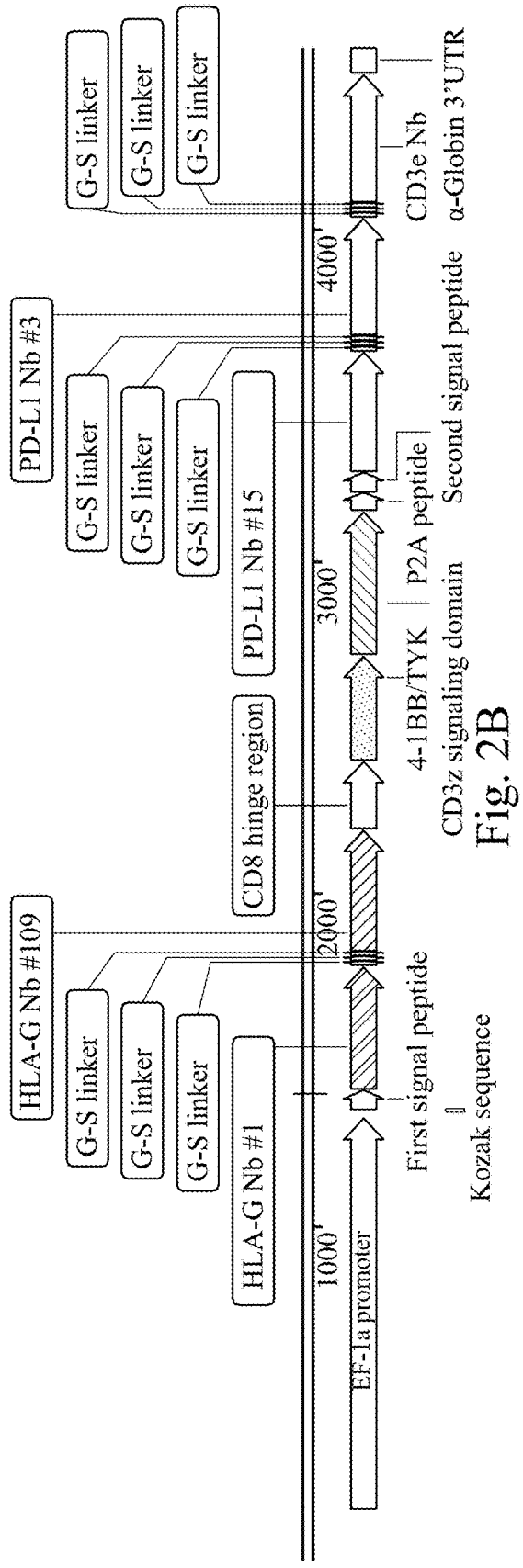
Fig. 2A
Fig. 2B

MULTISPECIFIC SINGLE DOMAIN ANTIBODIES CHIMERIC ANTIGEN RECEPTOR AND T-CELL ENGAGER, NUCLEIC ACID, EXPRESSING CELL THEREOF, PHARMACEUTICAL COMPOSITION FOR TREATING CANCER, AND METHOD FOR INHIBITING PROLIFERATION OF TUMOR CELL

RELATED APPLICATIONS

This application claims the benefits of priority of U.S. Provisional Application No. 63/223,985, filed on Jul. 21, 2021, the content of which is incorporated herein by reference.

SEQUENCE LISTING XML

A sequence listing XML submitted as an xml file via EFS-WEB is incorporated herein by reference. The sequence listing XML file submitted via EFS-WEB with the name "CP-5346-US_SEQ_LIST_XML_202506" created on May 29, 2025, which is 33,280 bytes in size.

BACKGROUND

Technical Field

The present disclosure relates to a pharmaceutical product containing an antigen or an antibody. More particularly, the present disclosure relates to a multispecific single domain antibodies chimeric antigen receptor and T-cell engager, a nucleic acid, an expressing cell thereof, a pharmaceutical composition for treating cancer, and a method for inhibiting a proliferation of a tumor cell.

Description of Related Art

Conventional cancer treatments include surgery, radiation therapy, chemotherapy, and target therapy. Cancer immunotherapy is another method for treating cancer except the above methods. The immune system of the patient is activated in the cancer immunotherapy by using tumor cell or tumor antigen to induce specific cellular and humoral immune responses for enhancing the anti-cancer ability of the patient, preventing the growth, spread, and recurrence of tumors, and achieving the purpose of removing or controlling tumors.

In recent years, more and more attention has been paid to the role of the immune system in the treatment of cancer. The current main tumor immunotherapy includes two categories, one is immune checkpoint blockade therapy, which restores the attack power of self T cell against the tumor cell by blocking the activation of immune checkpoints; the other is chimeric antigen receptor (CAR), which improves the antigen recognition and killing ability of the tumor cell by genetically modifying T cell. In addition, another new immunotherapy, bispecific T-cell engager (BiTE), is also worthy of attention. BiTE is an antibody molecule composed of single-chain fragment variables (scFvs) of two monoclonal antibodies, which has two molecular hooks that can specifically recognize antigens on the surface of target cell and CD3 on the surface of T cell, so it can activate the T cell and recognize tumor cell at the same time.

According to the way the tumor exists, it can be divided into solid tumors and non-solid tumors. The solid tumors often have definite masses clinically, and comprehensive treatment based on surgery is mainly used for treating the solid tumors. The non-solid tumors are mostly hematological malignancies, which usually present as indeterminate masses, and chemotherapy is the main treatment for the non-solid tumors. At present, tumor immunotherapy using CAR immune cell and BiTE in clinical practice is relatively effective in the treatment of hematological malignancies, but its effect on the solid tumors is limited. The selection of tumor-related target proteins is very critical to the therapeutic effect. Therefore, it is worth studying how to improve the therapeutic effect of CAR immune cell or BiTE in the solid tumors.

SUMMARY

According to one aspect of the present disclosure, a multispecific single domain antibodies chimeric antigen receptor and T-cell engager includes an HLA-G single domain antibody chimeric antigen receptor and a bispecific T-cell engager. The HLA-G single domain antibody chimeric antigen receptor includes, in order from an N-terminus to a C-terminus, an HLA-G single domain antibodies unit, a transmembrane domain and a CD3z signaling domain. The HLA-G single domain antibodies unit specifically binds to human leukocyte antigen G (HLA-G) and includes at least one HLA-G single domain antibody, and the at least one HLA-G single domain antibody includes the amino acid sequence of SEQ ID NO: 1 and/or the amino acid sequence of SEQ ID NO: 2. The transmembrane domain includes the amino acid sequence of SEQ ID NO: 19, the amino acid sequence of SEQ ID NO: 21, the amino acid sequence of SEQ ID NO: 23 or the amino acid sequence of SEQ ID NO: 29. The CD3z signaling domain includes the amino acid sequence of SEQ ID NO: 25. The bispecific T-cell engager is linked to the C-terminus of the HLA-G single domain antibody chimeric antigen receptor, and includes, in order from an N-terminus to a C-terminus, a PD-L1 single domain antibodies unit and a CD3e single domain antibody. The PD-L1 single domain antibodies unit specifically binds to programmed death-ligand 1 (PD-L1) and includes at least one PD-L1 single domain antibody, and the at least one PD-L1 single domain antibody includes the amino acid sequence of SEQ ID NO: 5 and/or the amino acid sequence of SEQ ID NO: 6. The CD3e single domain antibody specifically binds to CD3 epsilon (CD3e) and includes the amino acid sequence of SEQ ID NO: 9.

According to another aspect of the present disclosure, a nucleic acid encoding the multispecific single domain antibodies chimeric antigen receptor and T-cell engager according to the aforementioned aspect includes an HLA-G single domain antibody chimeric antigen receptor coding fragment and a bispecific T-cell engager coding fragment. The HLA-G single domain antibody chimeric antigen receptor coding fragment includes, in order from a 5' end to a 3' end, an HLA-G single domain antibodies unit coding fragment, a transmembrane domain coding fragment and a CD3z signaling domain coding fragment. The HLA-G single domain antibodies unit coding fragment includes at least one HLA-G single domain antibody coding fragment, and the at least one HLA-G single domain antibody coding fragment includes the nucleic acid sequence of SEQ ID NO: 3 and/or the nucleic acid sequence of SEQ ID NO: 4. The transmembrane domain coding fragment includes the nucleic acid sequence of SEQ ID NO: 20, the nucleic acid sequence of SEQ ID NO: 22, the nucleic acid sequence of SEQ ID NO: 24 or the nucleic acid sequence of SEQ ID NO: 30. The CD3z signaling domain coding fragment includes the nucleic acid sequence of SEQ ID NO: 26. The bispecific T-cell engager coding fragment is linked to the 3' end of the HLA-G single domain antibody chimeric antigen receptor coding fragment, and includes, in order from a 5' end to a 3' end, a PD-L1 single domain antibodies unit coding fragment and a CD3e single domain antibody coding fragment. The PD-L1 single domain antibodies unit coding fragment includes at least one PD-L1 single domain antibody coding fragment, and the at least one PD-L1 single domain antibody coding fragment includes the nucleic acid sequence of SEQ ID NO: 7 and/or the nucleic acid sequence of SEQ ID NO: 8. The CD3e single domain antibody coding fragment includes the nucleic acid sequence of SEQ ID NO: 10.

According to still another aspect of the present disclosure, a multispecific single domain antibodies chimeric antigen receptor and T-cell engager expressing cell includes an immune cell and the nucleic acid according to the aforementioned aspect. The multispecific single domain antibodies chimeric antigen receptor and T-cell engager expressing cell is obtained by transducing the nucleic acid into the immune cell.

According to yet another aspect of the present disclosure, a pharmaceutical composition for treating cancer includes the multispecific single domain antibodies chimeric antigen receptor and T-cell engager expressing cell according to the aforementioned aspect and a pharmaceutically acceptable carrier.

According to further another aspect of the present disclosure, a method for inhibiting a proliferation of a tumor cell includes administering a composition including a plurality of the multispecific single domain antibodies chimeric antigen receptor and T-cell engager expressing cells according to the aforementioned aspect to a subject in need for a treatment of a tumor.

BRIEF DESCRIPTION OF THE DRAWINGS

The present disclosure can be more fully understood by reading the following detailed description of the embodiment, with reference made to the accompanying drawings as follows:

FIGS. 2A and 2B are schematic views showing constructions of nucleic acids according to another embodiment of the present disclosure.

DETAILED DESCRIPTION

Figure 1:
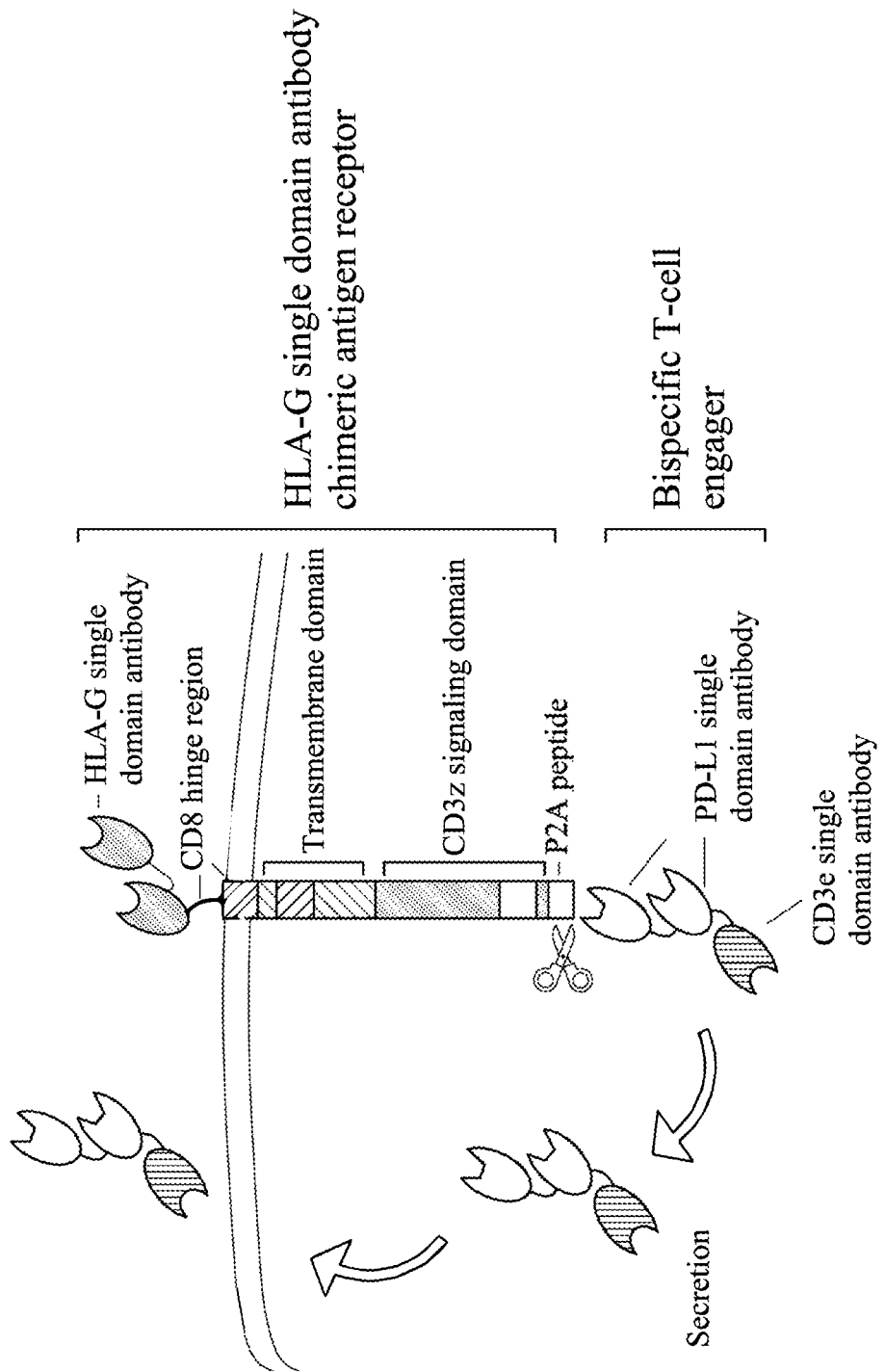
FIG. 1 is a schematic view showing a structure and mechanism of action of a multispecific single domain antibodies chimeric antigen receptor and T-cell engager of the present disclosure.

A multispecific single domain antibodies chimeric antigen receptor and T-cell engager, a nucleic acid encoding the multispecific single domain antibodies chimeric antigen receptor and T-cell engager, a multispecific single domain antibodies chimeric antigen receptor and T-cell engager expressing cell including the nucleic acid, a pharmaceutical composition for treating cancer including the multispecific single domain antibodies chimeric antigen receptor and T-cell engager expressing cell, and a method for inhibiting a proliferation of a tumor cell are provided. Tumor cell tests are performed to prove that the multispecific single domain antibodies chimeric antigen receptor and T-cell engager of the present disclosure can enhance a cytotoxicity of immune cell to tumor cell, so that the multispecific single domain antibodies chimeric antigen receptor and T-cell engager cell of the present disclosure expressing the multispecific single domain antibodies chimeric antigen receptor and T-cell engager has excellent specific lysis ability to the tumor cell. Animal experiments are also used to prove that the multispecific single domain antibodies chimeric antigen receptor and T-cell engager expressing cell of the present disclosure has excellent tumor growth inhibitory effect, so it can be used to inhibit the proliferation of the tumor cell. A pharmaceutical composition for treating cancer including the multispecific single domain antibodies chimeric antigen receptor and T-cell engager expressing cell of the present disclosure can effectively kill the tumor cell and then treat cancer.

The term "single domain antibody (sdAb)" refers to a type of antibody that lacks the light chain of the antibody and only has the variable region of the heavy chain. Because intact antibody contains two immunoglobulin light chains and two heavy chains, the molecular weight of the intact antibody is approximately 150-160 kDa. In contrast, the molecular weight of the single domain antibody is only about 12-15 kDa. Due to the small molecular weight of the single domain antibody, it is also called NANOBODY™. Although the structure of the single domain antibody is simple, it can still achieve specific antigen-binding affinity comparable to or even higher than that of the intact antibody.

The term "human leukocyte antigen G (HLA-G)" is a protein that in humans is encoded by HLA-G gene. The HLA-G belongs to nonclassical class I major histocompatibility complex (MHC) with a heavy chain of approximately 45 kDa. HLA-G is expressed on fetal derived placental cell and is active in the negative regulation of immune response. The main role of HLA-G is to inhibit the function of cytotoxic immune cell.

The term "programmed death-ligand 1 (PD-L1)" is a type 1 transmembrane protein with a size of 40 kDa and is encoded by CD274 gene. The PD-L1 can bind to its receptor, programmed cell death protein-1 (PD-1). Current studies have found that the increased expression of the PD-L1 on the surface of the tumor cell can bind to the PD-1 on the immune cell, inhibiting the loss of function of host immune cell and leading to apoptosis, thereby allowing the tumor cell to escape immune surveillance.

The term "CD3 epsilon (CD3e)" is a type 1 transmembrane protein on the surface of T cell, which is encoded by CD3E gene. CD3e plays an important role in T cell development. The CD3e forms the T cell receptor-CD3 complex together with CD3γ, CD3δ and CD3ζ and the T cell receptor α/β and γ/δ heterodimers. The CD3 complex plays an important role in coupling antigen recognition to several intracellular signaling pathways.

Reference will now be made in detail to the present embodiments of the present disclosure, examples of which are illustrated in the accompanying drawings.

I. Multispecific Single Domain Antibodies Chimeric Antigen Receptor and T-Cell Engager and Nucleic Acid of the Present Disclosure 1.1. Multispecific Single Domain Antibodies Chimeric Antigen Receptor and T-Cell Engager Please refer to FIG. 1, which is a schematic view showing a structure and mechanism of action of a multispecific single domain antibodies chimeric antigen receptor and T-cell engager of the present disclosure. The multispecific single domain antibodies chimeric antigen receptor and T-cell engager of the present disclosure includes, in order from an N-terminus to a C-terminus, an HLA-G single domain antibody chimeric antigen receptor and a bispecific T-cell engager.

The HLA-G single domain antibody chimeric antigen receptor includes, in order from the N-terminus to the C-terminus, an HLA-G single domain antibodies unit, a transmembrane domain and a CD3z signaling domain. The HLA-G single domain antibodies unit specifically binds to human leukocyte antigen G (HLA-G) and includes at least one HLA-G single domain antibody, and the at least one HLA-G single domain antibody includes the amino acid sequence of SEQ ID NO: 1 and/or the amino acid sequence of SEQ ID NO: 2. The transmembrane domain includes the amino acid sequence of SEQ ID NO: 19, the amino acid sequence of SEQ ID NO: 21, the amino acid sequence of SEQ ID NO: 23 or the amino acid sequence of SEQ ID NO: 29. The CD3z signaling domain includes the amino acid sequence of SEQ ID NO: 25. The HLA-G single domain antibody chimeric antigen receptor can form a tumor-targeting receptor complex, which enables the multispecific single domain antibodies chimeric antigen receptor and T-cell engager of the present disclosure to bind to specifically recognized human leukocyte antigen G and trigger signal transduction, resulting in a signal cascade leading to the activation and the proliferation of the multispecific single domain antibodies chimeric antigen receptor and T-cell engager expressing cell of the present disclosure, thereby triggering an exocytosis of lysed granules and killing the targeted tumor cell.

The N-terminal of the HLA-G single domain antibody chimeric antigen receptor can further include a first signal peptide, and the first signal peptide includes the amino acid sequence of SEQ ID NO: 11. The HLA-G single domain antibody chimeric antigen receptor can further include a CD8 hinge region, which links the HLA-G single domain antibodies unit and the transmembrane domain. The amino acid sequence of the CD8 hinge region is referenced as SEQ ID NO: 17.

The bispecific T-cell engager is linked to the C-terminus of the HLA-G single domain antibody chimeric antigen receptor, and includes, in order from the N-terminus to the C-terminus, a PD-L1 single domain antibodies unit and a CD3e single domain antibody. The PD-L1 single domain antibodies unit specifically binds to programmed death-ligand 1 (PD-L1) and includes at least one PD-L1 single domain antibody, and the at least one PD-L1 single domain antibody includes the amino acid sequence of SEQ ID NO: 5 and/or the amino acid sequence of SEQ ID NO: 6. The CD3e single domain antibody specifically binds to CD3e and includes the amino acid sequence of SEQ ID NO: 9.

The N-terminal of the bispecific T-cell engager can further include a second signal peptide, and the second signal peptide includes the amino acid sequence of SEQ ID NO: 15. The multispecific single domain antibodies chimeric antigen receptor and T-cell engager of the present disclosure can further include a P2A peptide, which links the HLA-G single domain antibody chimeric antigen receptor and the bispecific T-cell engager. The amino acid sequence of the P2A peptide is referenced as SEQ ID NO: 27. The P2A peptide enables self-cleavage of the expressed multispecific single domain antibodies chimeric antigen receptor and T-cell engager at the site between the HLA-G single domain antibody chimeric antigen receptor and the bispecific T-cell engager, and then the bispecific T-cell engager is cleaved and secreted extracellularly.

1.2. Nucleic Acid

A nucleic acid of the present disclosure encoding the multispecific single domain antibodies chimeric antigen receptor and T-cell engager according to the aforementioned aspect includes, in order from a 5' end to a 3' end, an HLA-G single domain antibody chimeric antigen receptor coding fragment and a bispecific T-cell engager coding fragment.

The HLA-G single domain antibody chimeric antigen receptor coding fragment includes, in order from the 5' end to the 3' end, an HLA-G single domain antibodies unit coding fragment, a transmembrane domain coding fragment and a CD3z signaling domain coding fragment. The HLA-G single domain antibodies unit coding fragment includes at least one HLA-G single domain antibody coding fragment, and the at least one HLA-G single domain antibody coding fragment includes the nucleic acid sequence of SEQ ID NO: 3 and/or the nucleic acid sequence of SEQ ID NO: 4. The transmembrane domain coding fragment includes the nucleic acid sequence of SEQ ID NO: 20, the nucleic acid sequence of SEQ ID NO: 22, the nucleic acid sequence of SEQ ID NO: 24 or the nucleic acid sequence of SEQ ID NO: 30. The CD3z signaling domain coding fragment includes the nucleic acid sequence of SEQ ID NO: 26.

The 5' end of the HLA-G single domain antibody chimeric antigen receptor coding fragment can further include a first signal peptide coding fragment, and the first signal peptide coding fragment includes the nucleic acid sequence of SEQ ID NO: 12. The HLA-G single domain antibody chimeric antigen receptor coding fragment can further include a CD8 hinge region coding fragment, which links the HLA-G single domain antibodies unit coding fragment and the transmembrane domain coding fragment. The nucleic acid sequence of the CD8 hinge region coding fragment is referenced as SEQ ID NO: 18.

The bispecific T-cell engager coding fragment is linked to the 3' end of the HLA-G single domain antibody chimeric antigen receptor coding fragment, and includes, in order from the 5' end to the 3' end, a PD-L1 single domain antibodies unit coding fragment and a CD3e single domain antibody coding fragment. The PD-L1 single domain antibodies unit coding fragment includes at least one PD-L1 single domain antibody coding fragment, and the at least one PD-L1 single domain antibody coding fragment includes the nucleic acid sequence of SEQ ID NO: 7 and/or the nucleic acid sequence of SEQ ID NO: 8. The CD3e single domain antibody coding fragment includes the nucleic acid sequence of SEQ ID NO: 10.

The 5' end of the bispecific T-cell engager coding fragment can further include a second signal peptide coding fragment, and the second signal peptide coding fragment includes the nucleic acid sequence of SEQ ID NO: 16. The nucleic acid of the present disclosure can further include a P2A peptide coding fragment, which links the HLA-G single domain antibody chimeric antigen receptor coding fragment and the bispecific T-cell engager coding fragment. The nucleic acid sequence of the P2A peptide coding fragment is referenced as SEQ ID NO: 28.

Please refer to FIGS. 2A and 2B. FIG. 2A is a schematic view showing a construction of a nucleic acid of Example 1 of the present disclosure, which is constructed by in vitro transcription (IVT) mRNA technology; FIG. 2B is a schematic view showing a construction of a nucleic acid of Example 2 of the present disclosure, which is constructed using a lentiviral vector, wherein labels in FIGS. 2A and 2B are encoded proteins.

In the nucleic acid of Example 1 and the nucleic acid of Example 2, the nucleic acid sequence of the first signal peptide coding fragment is referenced as SEQ ID NO: 12; the HLA-G single domain antibodies unit coding fragment includes two HLA-G single domain antibody coding fragments with the nucleic acid sequence referenced as SEQ ID NO: 3 (HLA-G Nb #1) and the nucleic acid sequence referenced as SEQ ID NO: 4 (HLA-G Nb #109), respectively; the transmembrane domain coding fragment is a 4-1BB/TYK coding fragment with the nucleic acid sequence referenced as SEQ ID NO: 30; the nucleic acid sequence of the CD3z signaling domain coding fragment is referenced as SEQ ID NO: 26. The nucleic acid sequence of the second signal peptide coding fragment is referenced as SEQ ID NO: 16; the PD-L1 single domain antibodies unit coding fragment includes two PD-L1 single domain antibody coding fragments with the nucleic acid sequence referenced as SEQ ID NO: 8 (PD-L1 Nb #15) and SEQ ID NO: 7 (PD-L1 Nb #3), respectively; the nucleic acid sequence of the CD3e single domain antibody coding fragment is referenced as SEQ ID NO: 10. In Example 1 and Example 2, the nucleic acid sequence of G-S linker is referenced as SEQ ID NO: 14. In addition, the nucleic acid of the present disclosure can select a promoter at the 5' end according to the constructed system. The promoter can be T7 promoter in the nucleic acid of Example 1, and the promoter can be the EF-1a promoter in the nucleic acid of Example 2.

1.3. HLA-G Single Domain Antibody

The HLA-G single domain antibody is prepared first, and then the kinetic analysis and the binding affinity analysis with HLA-G recombinant protein (Origene, CAT #: TP305216) are performed by surface plasmon resonance (SPR) analysis. The HLA-G single domain antibody prepared in this test example includes the HLA-G single domain antibody with the amino acid sequence referenced as SEQ ID NO: 1 (hereinafter referred to as "HLA-G Nb #1") and the HLA-G single domain antibody with the amino acid sequence referenced as SEQ ID NO: 2 (hereinafter referred to as "HLA-G Nb #109").

Figure 3A:
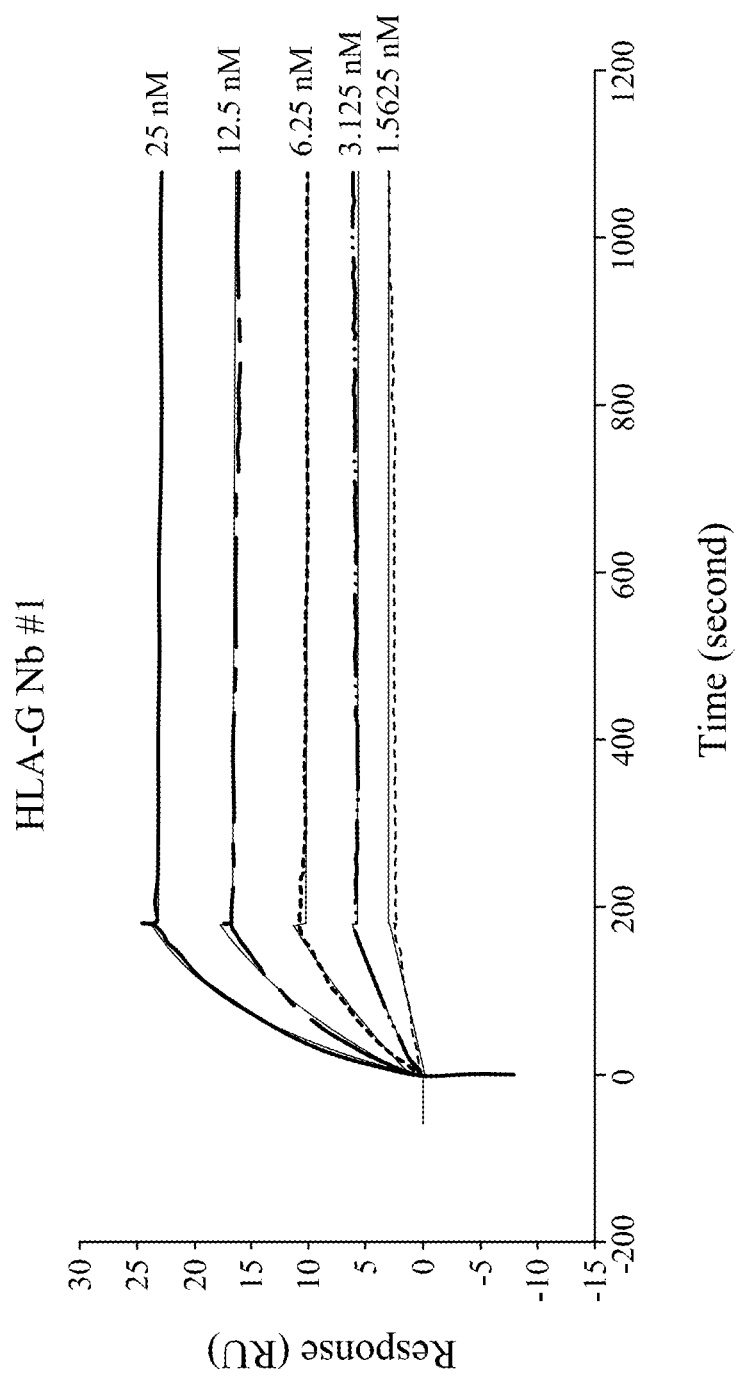
FIGS. 3A and 3B show analytical results of binding affinity of HLA-G single domain antibodies of the present disclosure.
Figure 3B:
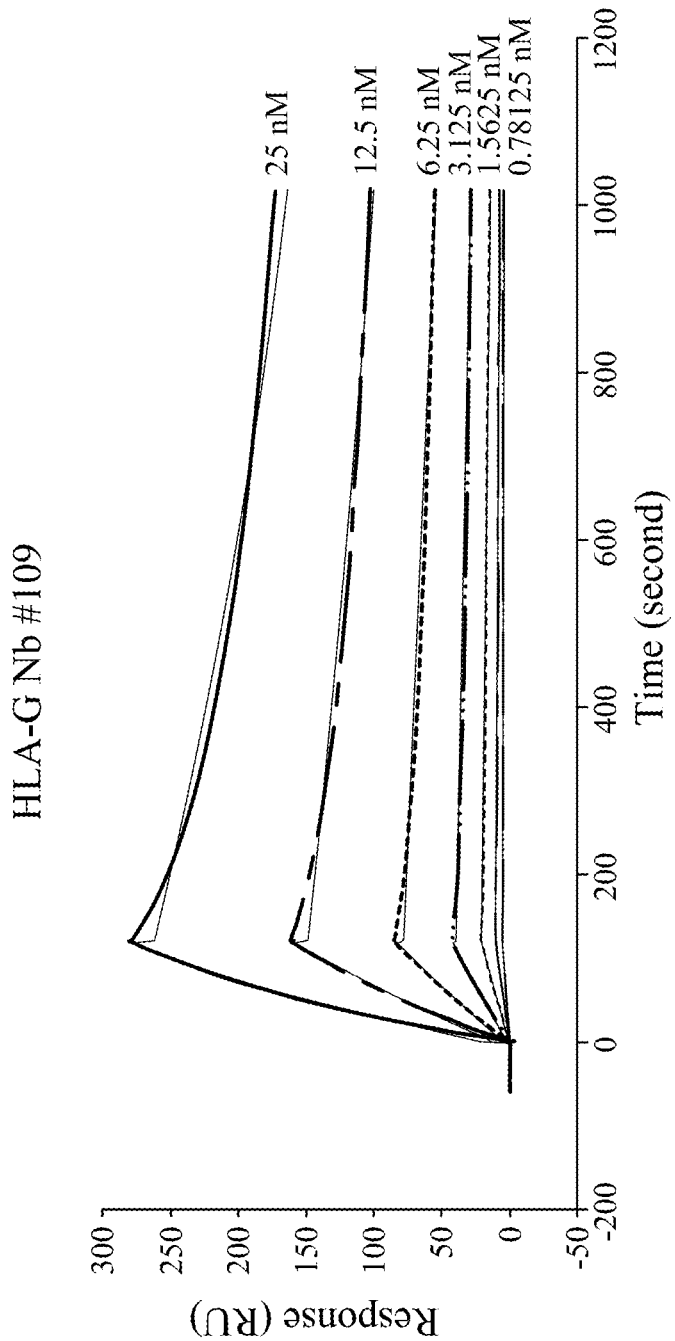

Please refer to FIG. 3A, FIG. 3B and Table 1. FIG. 3A shows analytical result of binding affinity of HLA-G Nb #1, FIG. 3B shows analytical result of binding affinity of HLA-G Nb #109, and Table 1 shows kinetic analysis results of HLA-G Nb #1 (abbreviated as #1 in Table 1) and HLA-G Nb #109 (abbreviated as #109 in Table 1).

TABLE 1

|  | $K_{on}$ (1/Ms) | $K_{off}$ (1/s) | $K_D$ (nM) | $R_{max}$ (RU) | Chi$^2$ |
|---|---|---|---|---|---|
| #1 | 1.66E+5 | 1.891E−5 | 0.11 | 27.40 | 0.118 |
| #109 | 3.490E+5 | 9.191E−4 | 2.6 | 408.4 | 6.37 |

In FIG. 3A, FIG. 3B and Table 1, the HLA-G single domain antibodies of the present disclosure have excellent binding affinities to the HLA-G, wherein the $K_D$ of the HLA-G Nb #1 can reach 0.11 nM, and the $K_D$ of the HLA-G Nb #109 can reach 2.6 nM.

To further test whether the HLA-G single domain antibody of the present disclosure can block an interaction and/or binding of the HLA-G and an HLA-G receptor, the HLA-G receptor used in the experiment is KIR2DL4 or LILRB1, and the HLA-G single domain antibody used is the HLA-G Nb #1. Competitive ELISA is performed to test whether the HLA-G Nb #1 can block the interaction and/or binding of biotinylated KIR2DL4 (Sino Biological, CAT #: 13052-H02S) and biotinylated LILRB1 (Sino Biological, CAT #: 16014-H08H) with HLA-G recombinant protein (Origene, CAT #: TP305216). In addition, a commercially available HLA-G monoclonal antibody (87G, ThermoFisher) is used as a control group.

Figure 5:
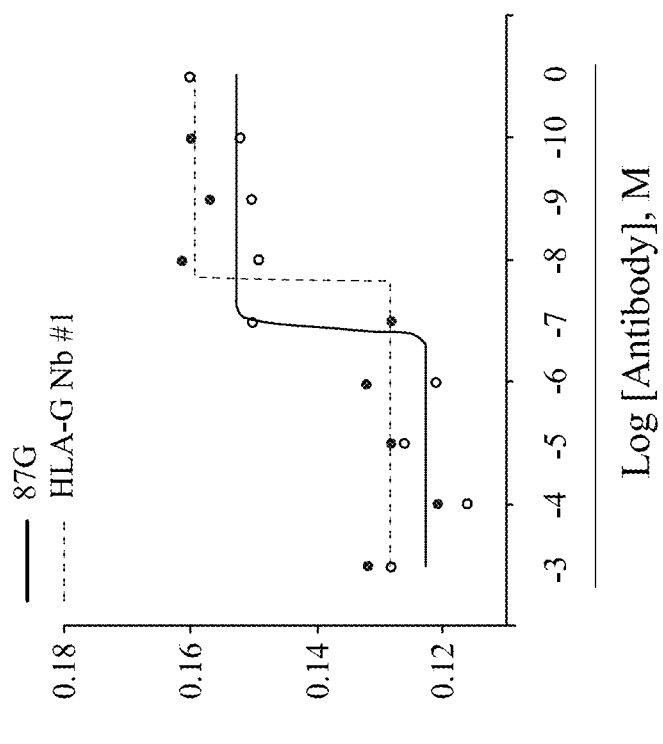
FIG. 5 shows analytical result of a KIR2DL4 blocking activity of the HLA-G single domain antibody of the present disclosure.
Figure 4:
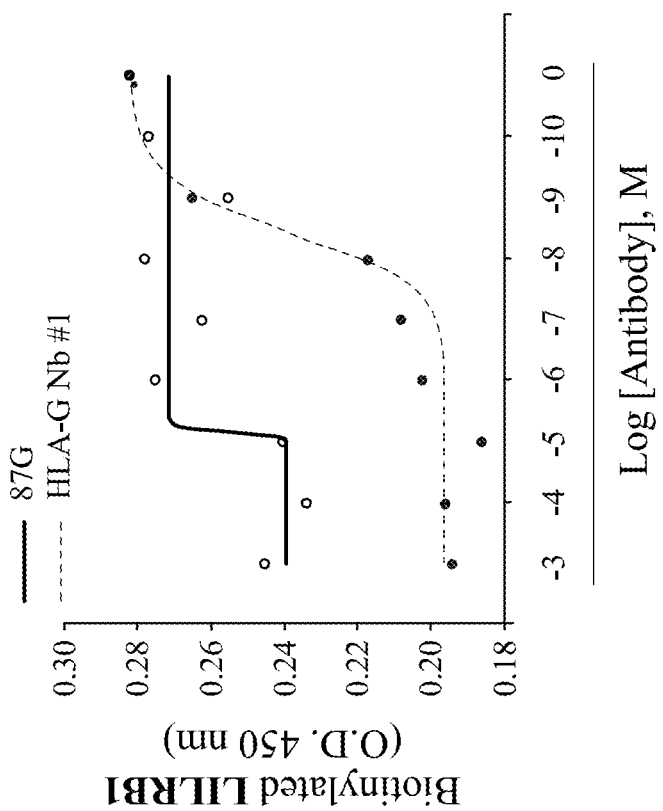
FIG. 4 shows analytical result of a LILRB1 blocking activity of the HLA-G single domain antibody of the present disclosure.

Please refer to FIG. 4 and FIG. 5. FIG. 4 shows analytical result of a LILRB1 blocking activity of the HLA-G single domain antibody of the present disclosure, and FIG. 5 shows analytical result of a KIR2DL4 blocking activity of the HLA-G single domain antibody of the present disclosure. In FIG. 4, the $IC_{50}$ of the 87G for the LILRB1 blocking activity is greater than 1 μM, while the $IC_{50}$ of the HLA-G Nb #1 for the LILRB1 blocking activity is approximately 70 nM. In FIG. 5, the $IC_{50}$ of the 87G for the KIR2DL4 blocking activity is approximately 104 nM, while the $IC_{50}$ of the HLA-G Nb #1 for the KIR2DL4 blocking activity is approximately 22 nM. The above results indicate that the HLA-G single domain antibody of the present disclosure has an excellent ability to block the interaction and binding of the HLA-G with the LILRB1 and the KIR2DL4.

The effect of the HLA-G single domain antibody of the present disclosure on enhancing a natural killer (NK) cell-mediated cytotoxicity on the tumor cell is also tested experimentally. The tumor cell used is MDA-MB-231 cell, and the HLA-G single domain antibodies used are the HLA-G Nb #1 and the HLA-G Nb #109. The MDA-MB-231 cells with a cell density of $1\times10^5$ cells/well are seeded in a 12-well plate. After overnight culture, $3\times10^5$ cells/well or $5\times10^5$ cells/well of primary NK cells are added into the wells containing the MDA-MB-231 cells, and then 1 mg/ml of the HLA-G Nb #1 and/or the HLA-G Nb #109 or 10 mg/ml of the 87G are added, respectively. After 48 hours, LIVE/DEAD cell-mediated cytotoxicity assay is performed using flow cytometry to determine specific lysis to the MDA-MB-231 cell by the primary NK cell.

Figure 6A:
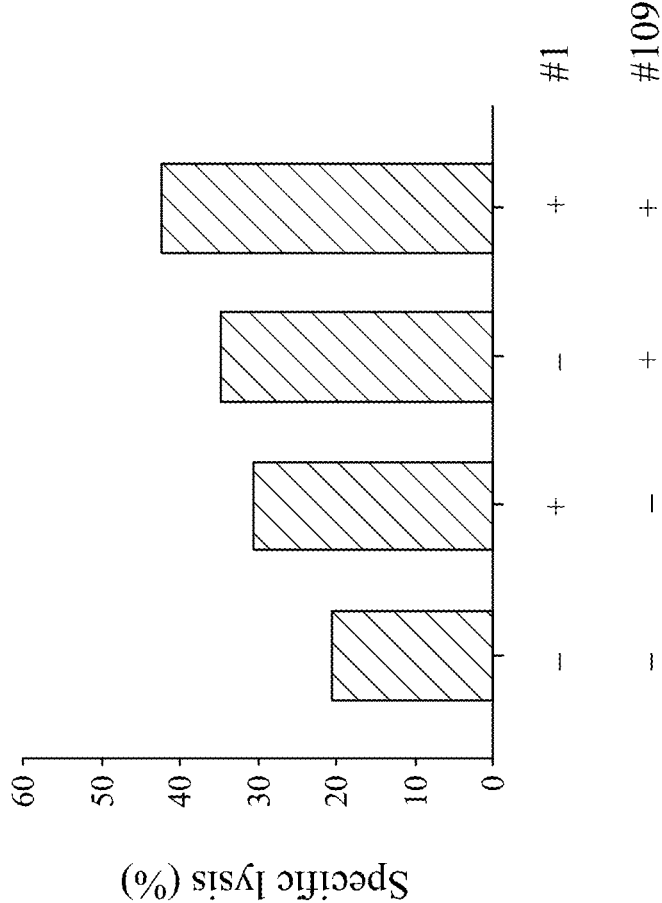
FIGS. 6A and 6B show analytical results of effects of the HLA-G single domain antibody of the present disclosure on enhancing a natural killer (NK) cell-mediated cytotoxicity on MDA-MB-231 cell.
Figure 6B:
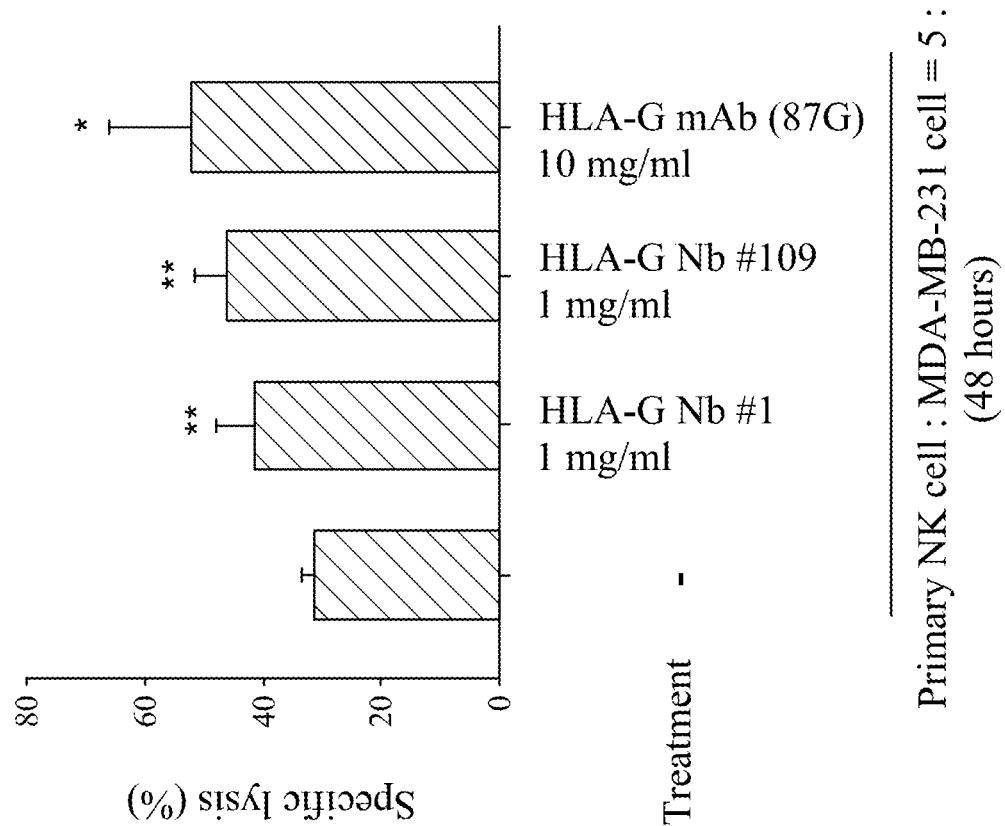

Please refer to FIGS. 6A and 6B, which show analytical results of the effects of the HLA-G single domain antibody of the present disclosure on enhancing a NK cell-mediated cytotoxicity on the MDA-MB-231 cell. In FIG. 6B, * represents p<0.05, and ** represents p<0.01. In FIG. 6A, the group treated with the HLA-G Nb #1 or the HLA-G Nb #109 alone compared to the untreated group, the HLA-G single domain antibody of the present disclosure can enhance the specific lysis to the MDA-MB-231 cell by the primary NK cell. In addition, the group treated with the HLA-G Nb #1 and the HLA-G Nb #109 at the same time can significantly enhance the specific lysis to the MDA-MB-231 cell by the primary NK cell. In FIG. 6B, the group treated with the HLA-G Nb #1 or the HLA-G Nb #109 compared to the untreated group, the HLA-G single domain antibody of the present disclosure can enhance the specific lysis to the MDA-MB-231 cell by the primary NK cell with a statistically significant difference (p<0.01). Compared with the HLA-G monoclonal antibody-87G, at the same antibody concentration, the HLA-G single domain antibody of the present disclosure can significantly enhance the specific lysis to the MDA-MB-231 cell by the primary NK cell.

1.4. PD-L1 Single Domain Antibody

The PD-L1 single domain antibody is prepared first, and then whether the PD-L1 single domain antibody of the present disclosure can block the interaction and/or binding of PD-L1 and PD-L1 receptor is tested. The PD-L1 single domain antibody prepared in this test example includes the PD-L1 single domain antibody with the amino acid sequence referenced as SEQ ID NO: 5 (hereinafter referred to as "PD-L1 Nb #3") and the PD-L1 single domain antibody with the amino acid sequence referenced as SEQ ID NO: 6 (hereinafter referred to as "PD-L1 Nb #15").

The blocking test is performed using the PD-1/PD-L1 Blockade Bioassay Kit (Promega), the PD-L1 single domain antibodies used are the PD-L1 Nb #3 and the PD-L1 Nb #15, and the PD-L1 receptor used is the PD-1. PD-L1 aAPC/CHO-K1 cells at a cell density of $1\times10^4$ cells/well are seeded in 96-well plates, and after overnight culture, $1\times10^4$ cells/well PD-1 effector cells are added into the wells containing the PD-L1 aAPC/CHO-K1 cells, and then different concentrations of the PD-L1 Nb #3, the PD-L1 Nb #15 or atezolizumab are added into the wells. After 6 hours, Bio-Glo™ reagent is added and luminescence is measured using the GloMax® Discover system, and the data is plotted as a 4PL curve using Sigmaplot software. The atezolizumab is a commercially available PD-L1 monoclonal antibody, which is used as a control group.

Figure 7:
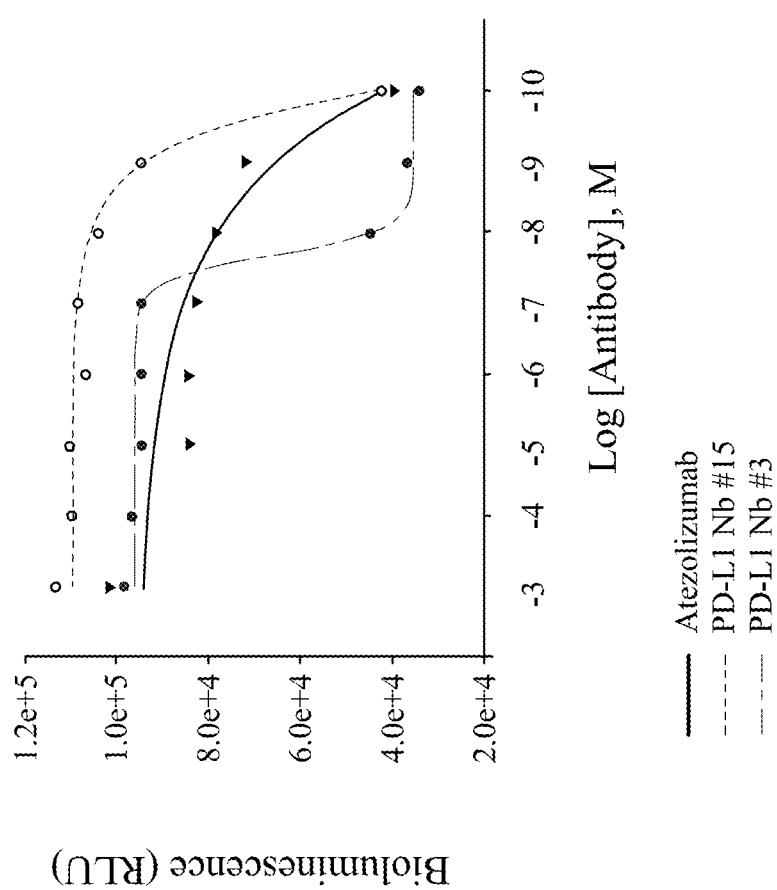
FIG. 7 shows analytical result of the PD-L1/PD-1 blocking activity of the PD-L1 single domain antibodies of the present disclosure.

Please refer to FIG. 7, which shows analytical result of PD-L1/PD-1 blocking activities of the PD-L1 single domain antibodies of the present disclosure. In FIG. 7, the $IC_{50}$ of the atezolizumab for the PD-1 blocking activity is about 41 nM, the $IC_{50}$ of the PD-L1 Nb #15 for the PD-1 blocking activity is approximately 0.48 nM, and the $IC_{50}$ of the PD-L1 Nb #3 for the PD-1 blocking activity is about 37.7 nM. The results indicate that the PD-L1 single domain antibodies of the present disclosure have excellent abilities to block the interaction and binding between the PD-L1 and the PD-1.

Figure 8A:
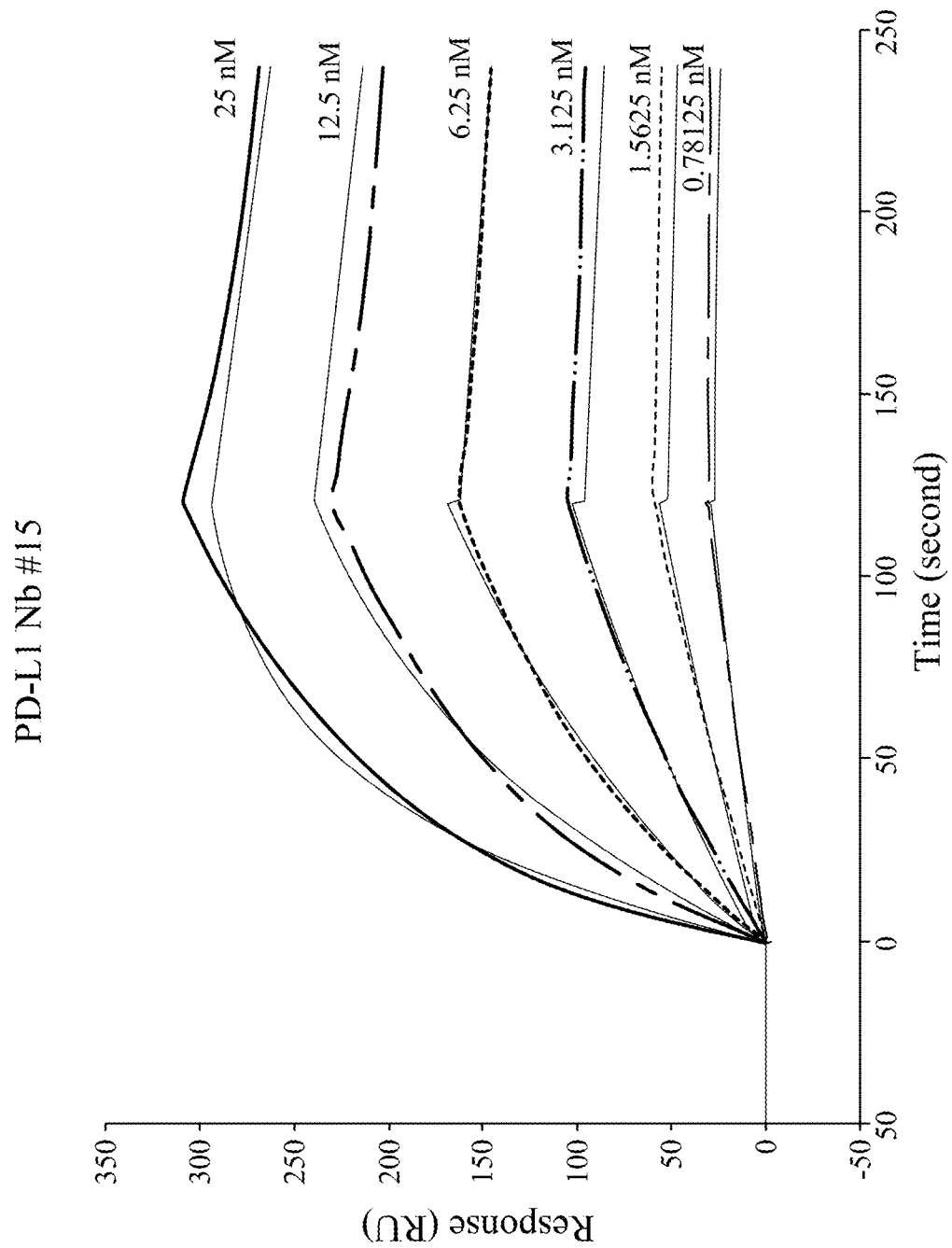
FIGS. 8A and 8B show analytical results of binding affinity of PD-L1 single domain antibodies of the present disclosure.

The kinetic analysis of the PD-L1 single domain antibodies of the present disclosure and the binding affinity analysis of the PD-L1 recombinant protein (Sino Biological, CAT #: 10084-H05H) are performed by SPR analysis. Please refer to FIG. 8A, FIG. 8B and Table 2, which show analytical results of binding affinity of the PD-L1 single domain antibodies of the present disclosure. FIG. 8A shows analytical result of the binding affinity of PD-L1 Nb #15, FIG. 8B shows analytical result of the binding affinity of PD-L1 Nb #3, and Table 2 shows kinetic analysis results of the PD-L1 Nb #15 (abbreviated as #15 in Table 2) and the PD-L1 Nb #3 (abbreviated as #3 in Table 2).

TABLE 2

|  | $K_{on}$ (1/Ms) | $K_{off}$ (1/s) | $K_D$ (nM) | $R_{max}$ (RU) | Chi$^2$ |
| --- | --- | --- | --- | --- | --- |
| #15 | 1.03E+6 | 9.361E−4 | 0.91 | 317.3 | 33.0 |
| #3 | 6.045E+6 | 5.21E−3 | 0.86 | 331.9 | 7.65 |

Figure 8B:
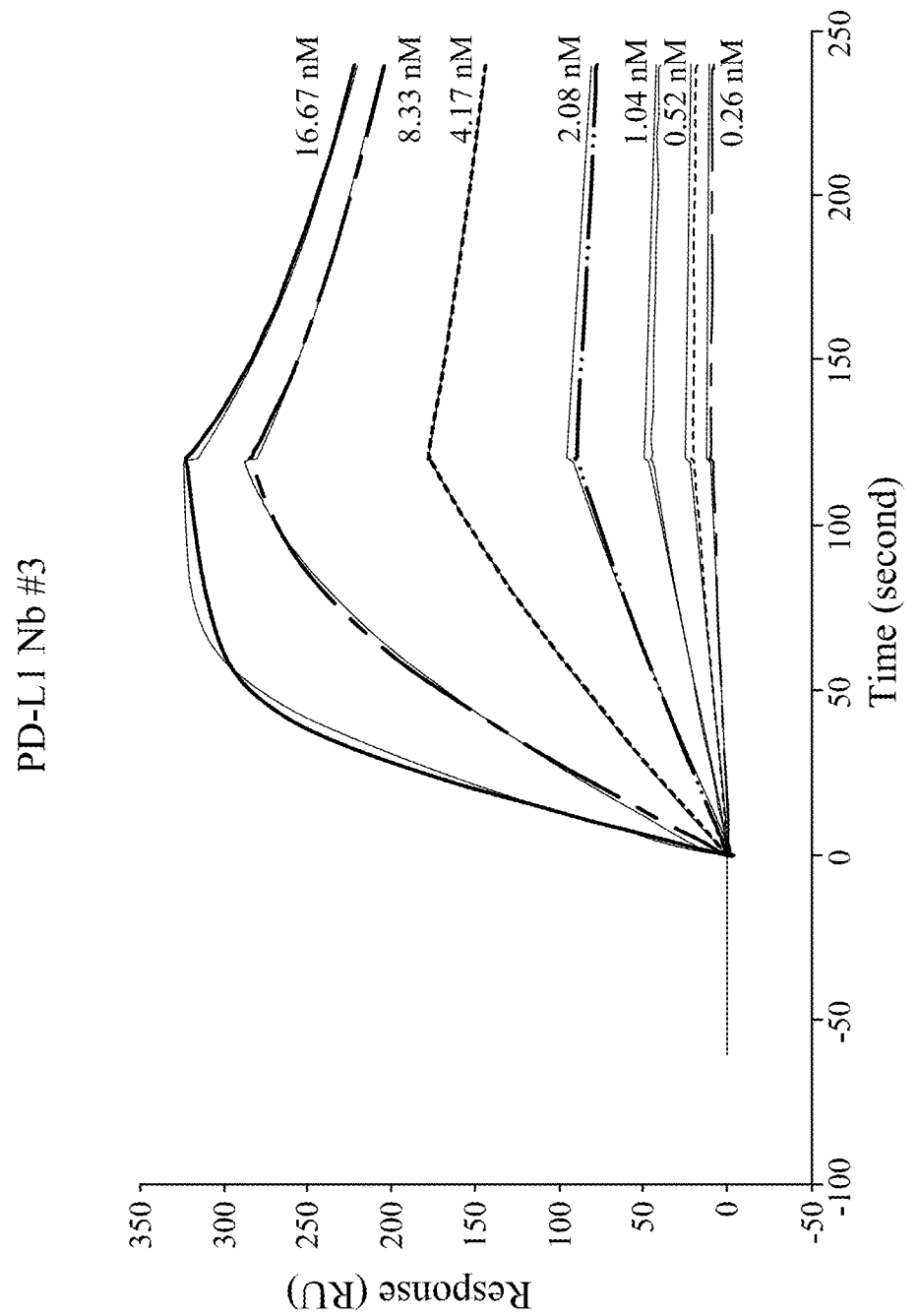

In FIG. 8A, FIG. 8B and Table 2, the PD-L1 single domain antibodies of the present disclosure have excellent binding affinities to the PD-L1, wherein the $K_D$ of the PD-L1 Nb #15 can reach 0.91 nM, and the $K_D$ of the PD-L1 Nb #3 can reach 0.86 nM.

The effect of the PD-L1 single domain antibody of the present disclosure on enhancing a γδT cell-mediated cytotoxicity on the tumor cell is also tested experimentally. The tumor cell used is the MDA-MB-231 cell, and the PD-L1 single domain antibodies used are the PD-L1 Nb #15 and the PD-L1 Nb #3. The MDA-MB-231 cells with the cell density of $1\times10^5$ cells/well are seeded in the 12-well plate. After overnight culture, $3\times10^5$ cells/well or $5\times10^5$ cells/well of primary γδT cells (hereinafter referred to as "γδT cell") are added into the wells containing the MDA-MB-231 cells, and then 1 mg/ml of the PD-L1 Nb #15 or the PD-L1 Nb #3 or 10 mg/ml of the atezolizumab are added, respectively. After 48 hours, LIVE/DEAD cell-mediated cytotoxicity assay is performed using flow cytometry to determine specific lysis to the MDA-MB-231 cell by the γδT cell.

Figure 9:
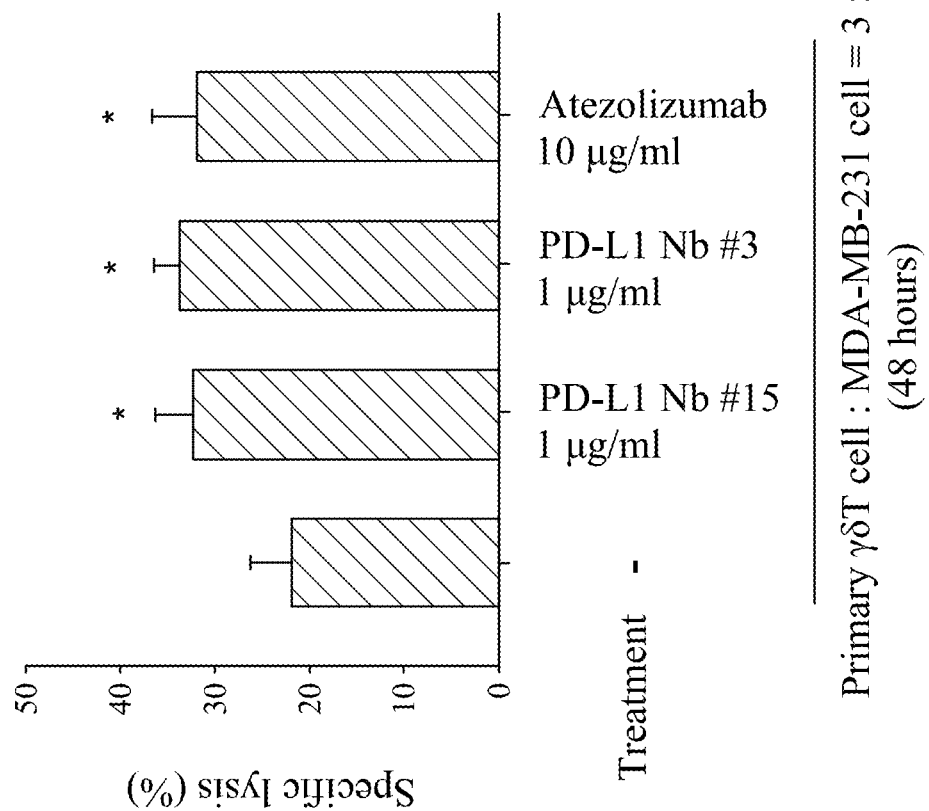
FIG. 9 shows analytical results of an effect of the PD-L1 single domain antibodies of the present disclosure on enhancing a γδT cell-mediated cytotoxicity on MDA-MB-231 cell.

Please refer to FIG. 9, which shows analytical results of the effect of the PD-L1 single domain antibodies of the present disclosure on enhancing the γδT cell-mediated cytotoxicity on the MDA-MB-231 cell, wherein * represents p<0.05. In FIG. 9, the group treated with the PD-L1 Nb #15 or the PD-L1 Nb #3 compared to the untreated group, the PD-L1 single domain antibody of the present disclosure can enhance the specific lysis to the MDA-MB-231 cell by the γδT cell with a statistically significant difference (p<0.05). Compared with the atezolizumab, at the same antibody concentration, the PD-L1 single domain antibody of the present disclosure can significantly enhance the specific lysis to the MDA-MB-231 cell by the γδT cell.

1.5. CD3e Single Domain Antibody

The CD3e single domain antibody is prepared first, and then the effect of the CD3e single domain antibody of the present disclosure on the proliferation of $CD3^+$ T cell in peripheral blood mononuclear cell (PBMC) and the γδT cell is tested. The amino acid sequence of the CD3e single domain antibody prepared in this test example is referenced as SEQ ID NO: 9 (hereinafter referred to as "CD3e Nb"). Frist, 12-well plates are pre-coated with 1 mg/ml of the CD3e Nb, 10 mg/ml of OKT3 (Invitrogen, CAT #: MA1-10175) or untreated, wherein the OKT3 is a commercial CD3 monoclonal antibody. The PBMC or the γδT cell with the cell density of $1 \times 10^6$ cells/well are seeded in the 12-well plate, and then 50 IU/ml of IL-2 (Gibco, CAT #: PHC0021) and 2 mg/ml of IL-15 (Sino Biological, CAT #: 10360-H07E) are added into each well. After 7 days, the total cell numbers are recorded, then stained with FITC-conjugated OKT3 (eBioscience, CAT #: 11-0037-42) and then analyzed by flow cytometry. The pictures are taken by microscope at 40×, and the CD3 positive T cell (hereinafter referred to as "$CD3^+$ T cell") is calculated as % of the $CD3^+$ T cells×total cell number.

Figure 10:
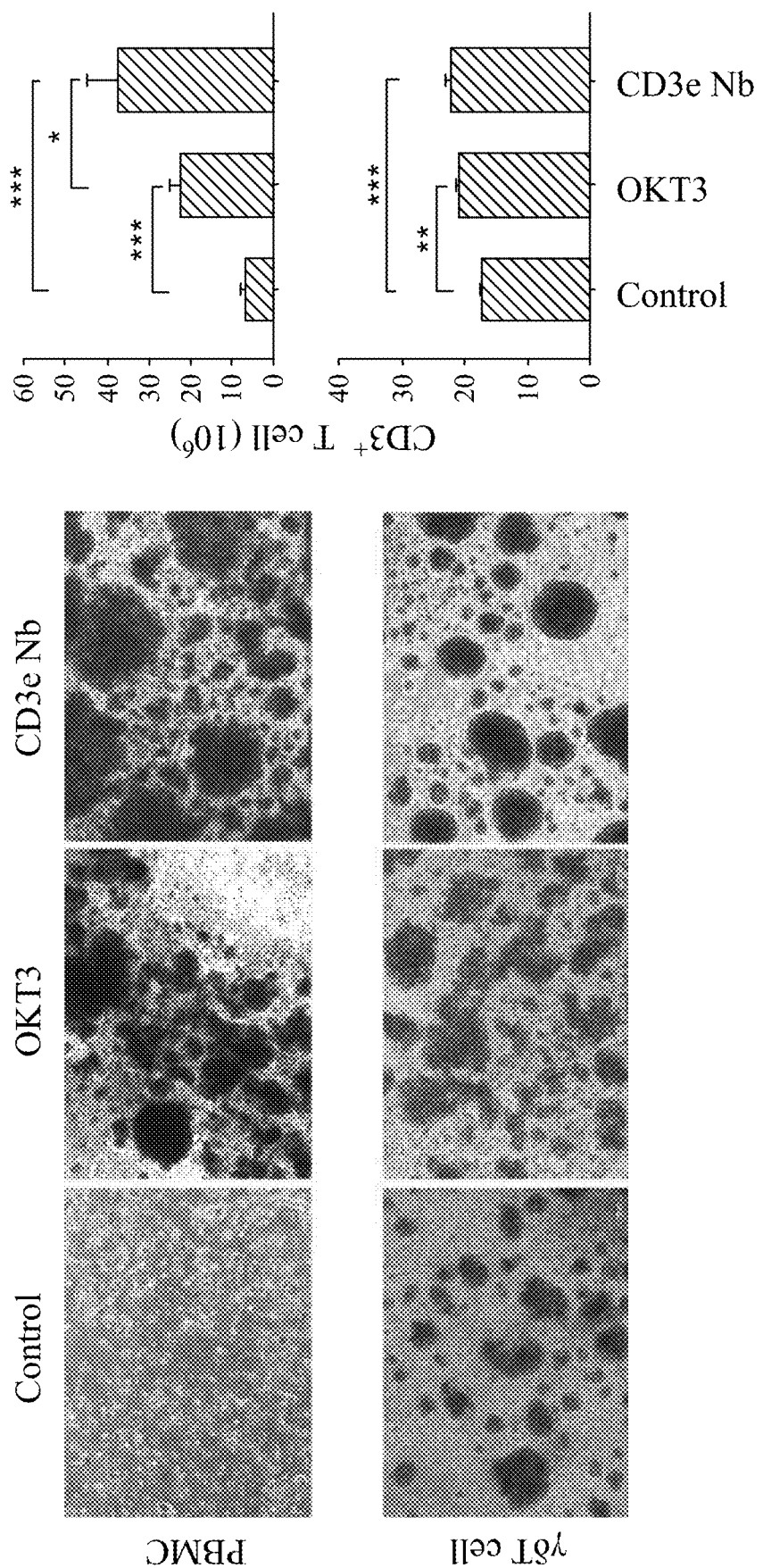
FIG. 10 shows analytical results of an effect of a CD3e single domain antibody on the proliferation of $CD3^+$ T cell in peripheral blood mononuclear cell (PBMC) and γδT cell.

Please refer to FIG. 10, which shows analytical results of the effect of the CD3e single domain antibody on the proliferation of the $CD3^+$ T cell in the PBMC and the γδT cell, wherein * represents $p<0.05$,  represents $p<0.01$, and * represents $p<0.001$. In the part of the PBMC, treatment of the CD3e single domain antibody of the present disclosure and OKT3 can both enhance the proliferation of the $CD3^+$ T cell in the PBMC. However, compared with the untreated group or the group treated with OKT3, the group treated with the CD3e single domain antibody of the present disclosure has a statistically significant difference in the effect of enhancing the proliferation of the $CD3^+$ T cell in the PBMC ($p<0.001$ and $p<0.05$, respectively). In the part of the γδT cell, treatment of the CD3e single domain antibody of the present disclosure and OKT3 can both enhance the proliferation of the $CD3^+$ T cell in the γδT cell, and the difference is statistically significant ($p<0.001$ and $p<0.01$, respectively). In addition, compared with the group treated with the OKT3, the group treated with the CD3e single domain antibody has a more significant enhancement effect. In conclusion, the CD3e single domain antibody of the present disclosure has an excellent ability to enhance the proliferation of $CD3^+$ T cell in the PBMC and the γδT cell.

Figure 11:
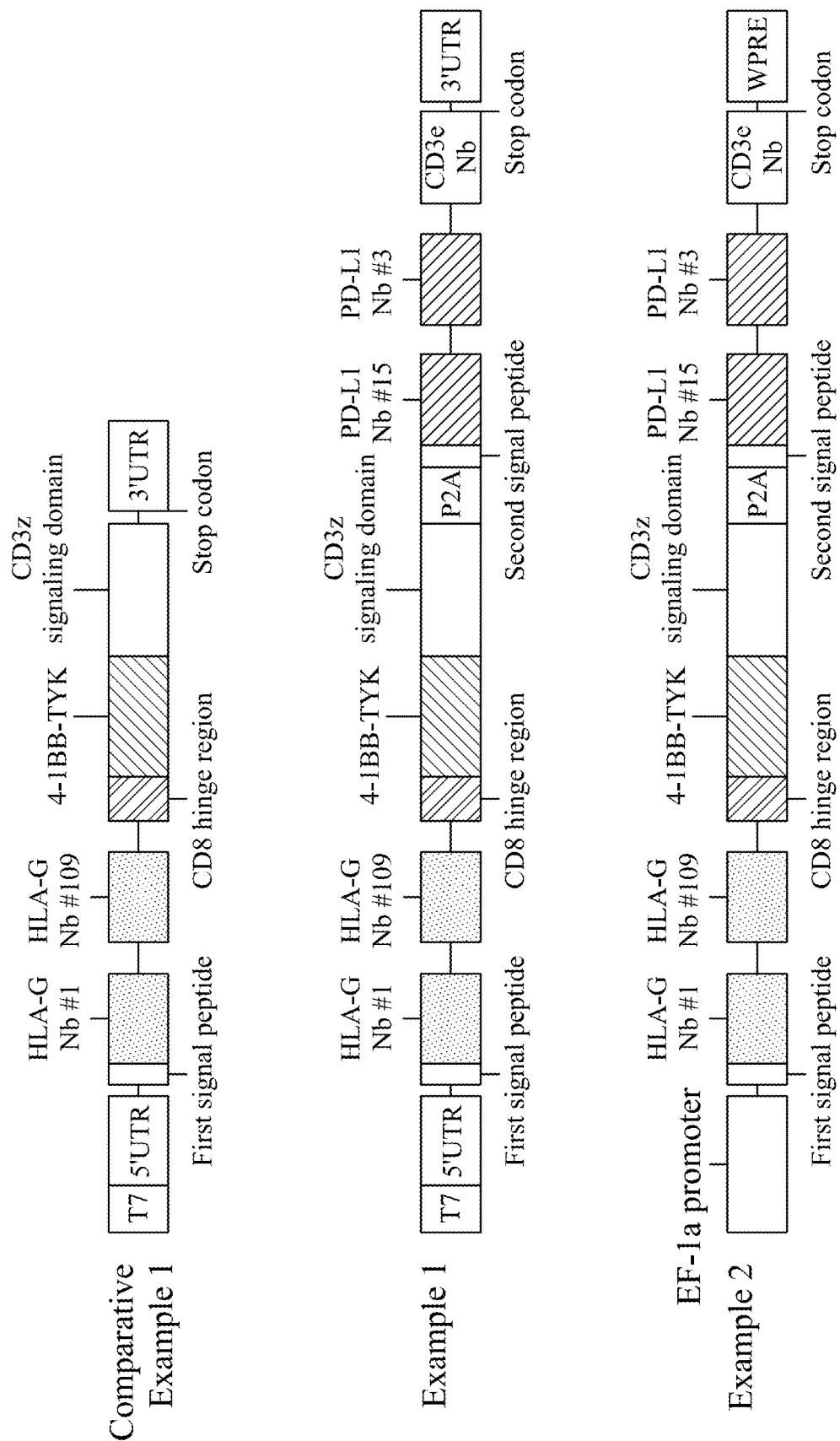
FIG. 11 is a schematic view showing constructions of the nucleic acid of Example of the present disclosure and the nucleic acid of Comparative Example.

II. Multispecific Single Domain Antibodies Chimeric Antigen Receptor and T-Cell Engager Expressing Cell, Use Thereof and Pharmaceutical Composition for Treating Cancer of the Present Disclosure Please refer to FIG. 11, which is a schematic view showing constructions of the nucleic acid of Example of the present disclosure and the nucleic acid of Comparative Example, wherein the labels are the encoded proteins. The nucleic acid of Example 1 (hereinafter referred to as "Example 1") is constructed using the IVT mRNA technology, and the nucleic acid of Example 2 (hereinafter referred to as "Example 2") is constructed using the lentiviral vector, and the construction details are as described above, and will not be repeated here. The nucleic acid of Comparative Example 1 is an HLA-G single domain antibody chimeric antigen receptor constructed by the IVT mRNA technology, which does not include a bispecific T-cell engager targeting the PD-L1 and the CD3e. The first signal peptide coding fragment in the nucleic acid of Comparative Example 1 is the CD8a signal peptide fragment encoding with the nucleic acid sequence referenced as SEQ ID NO: 12; the HLA-G single domain antibodies unit coding fragment includes two HLA-G single domain antibody coding fragments with the nucleic acid sequence referenced as SEQ ID NO: 3 (HLA-G Nb #1) and the nucleic acid sequence referenced as SEQ ID NO: 4 (HLA-G Nb #109), respectively; the transmembrane domain coding fragment is the 4-1BB/TYK coding fragment with the nucleic acid sequence referenced as SEQ ID NO: 30; the nucleic acid sequence of the CD3z signaling domain coding fragment is referenced as SEQ ID NO: 26.

2 μg of the nucleic acid of Example 1 or the nucleic acid of Comparative Example 1 is electroporated into $1 \times 10^6$ γδT cells, respectively, to obtain the multispecific single domain antibodies chimeric antigen receptor and T-cell engager expressing cell of Example 3 (hereinafter referred to as "Example 3") and the HLA-G single domain antibody chimeric antigen receptor expressing cells of Comparative Example 2 (hereinafter referred to as "Comparative Example 2"). In addition, the nucleic acid of Example 2 is transduced into the γδT cell by lentivirus to obtain the multispecific single domain antibodies chimeric antigen receptor and T-cell engager expressing cells of Example 4 (hereinafter referred to as "Example 4"). $1 \times 10^6$ Comparative Example 2, Example 3, Example 4 and parental γδT cells (hereinafter referred to as "parental cell") are then stained with iFluor 647-conjugated anti-VHH antibody (GenScript). After washing twice with PBS containing 1% BSA, the expression status of the HLA-G single domain antibody chimeric antigen receptor in Comparative Example 2, Example 3 and Example 4 is determined every day from Day 1 to Day 7 by flow cytometry and using the parental cell as background control to determine the transduction rates of Example 1 and Example 2 in the γδT cell.

A pharmaceutical composition for treating cancer of the present disclosure includes the multispecific single domain antibodies chimeric antigen receptor and T-cell engager expressing cell of the present disclosure and a pharmaceutically acceptable carrier. Preferably, the pharmaceutical composition for treating cancer can further include another agent for treating cancer, such as chemotherapeutic drugs, targeted therapy drugs, antibody drugs, immunomodulators or combinations thereof.

Figure 12A:
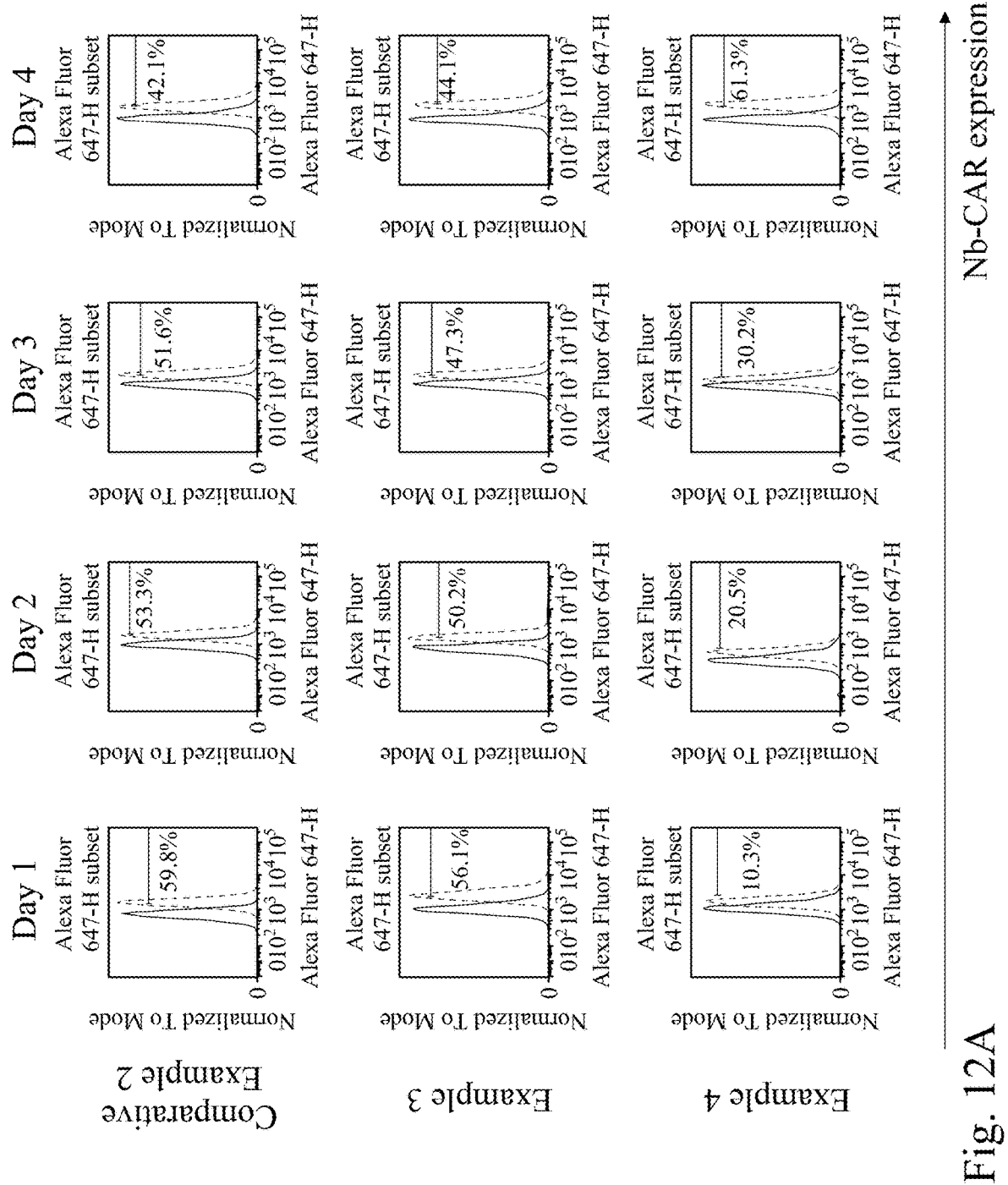
FIGS. 12A and 12B show analytical results of the expression of the HLA-G single domain antibody chimeric antigen receptors expressed by multispecific single domain antibodies chimeric antigen receptor and T-cell engager expressing cells of the present disclosure.
Figure 12B:
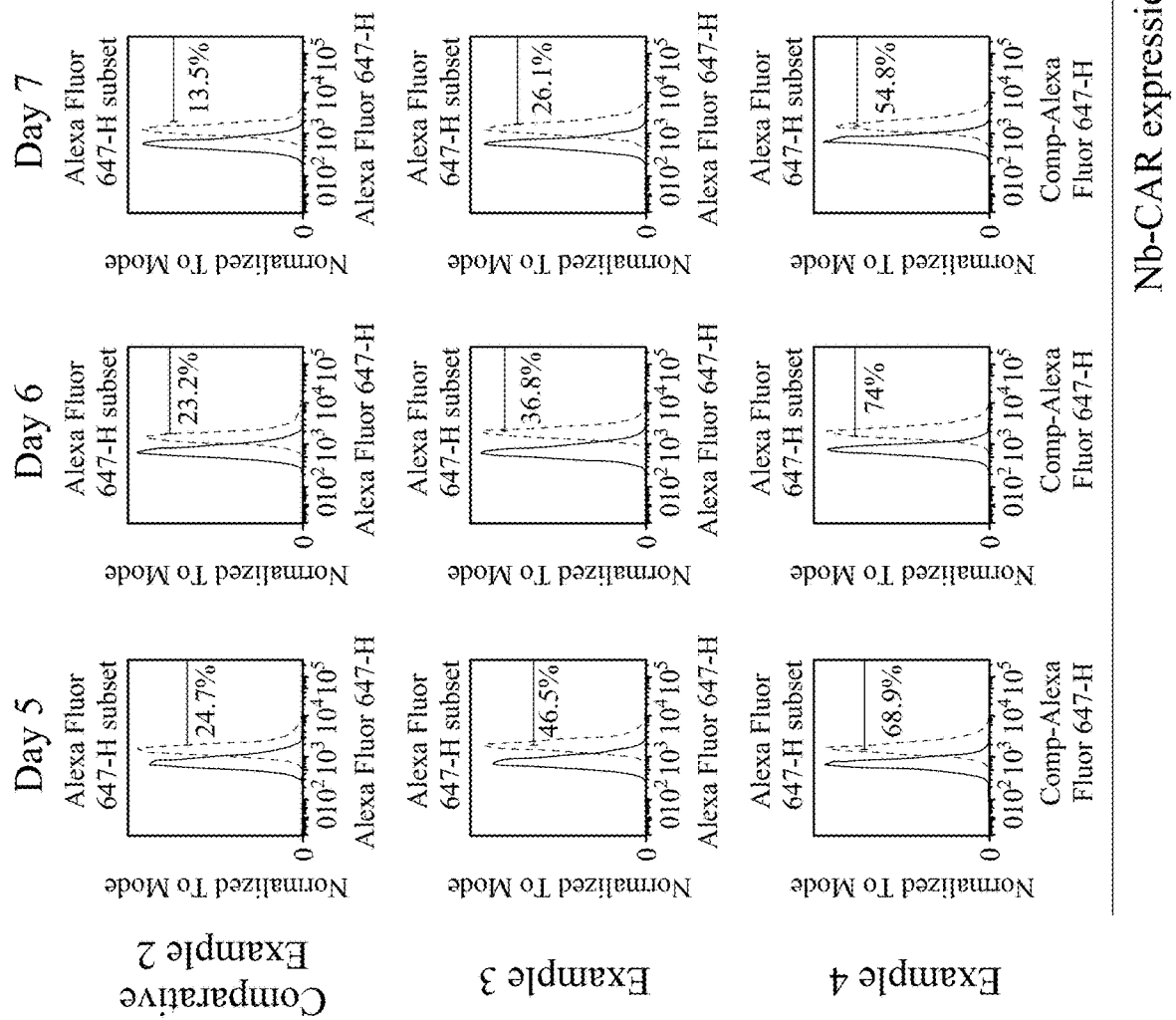

Please refer to FIGS. 12A and 12B, which show analytical results of the expression of the HLA-G single domain antibody chimeric antigen receptors expressed in Comparative Example 2, Example 3 and Example 4, wherein FIG. 12A shows analytical results from Day 1 to Day 4, and FIG. 12B shows analytical results from Day 5 to Day 7. The results of FIGS. 12A and 12B show that the expression level of the HLA-G single domain antibody chimeric antigen receptor in Comparative Example 2 is the highest on Day 1, reaching 59.8%, but the expression level decreases day by day, and only 13.5% remained on Day 7. The expression level of the HLA-G single domain antibody chimeric antigen receptor in Example 3 is also the highest on Day 1, reaching 56.1%, and the expression level also decreases day by day, but the expression level is still 26.1% on Day 7. The expression level of the HLA-G single domain antibody chimeric antigen receptor in Example 3 is only 10.3% on Day 1, but the expression level increases day by day to the highest on Day 6, reaching 74%, and the expression level decreases to 54.8% on Day 7. The above results indicates that the multispecific single domain antibodies chimeric antigen receptor and T-cell engager expressing cell of the present disclosure can stably express the HLA-G single domain antibody chimeric antigen receptor transduced therein.

The cytotoxicity of the multispecific single domain antibodies chimeric antigen receptor and T-cell engager expressing cell of the present disclosure to the tumor cells is further tested. The multispecific single domain antibodies chimeric antigen receptor and T-cell engager expressing cell used in this test is Example 4, and the tested tumor cells include triple-negative breast cancer (TNBC) cells, glioblastoma multiforme cells, lung cancer cells, ovarian cancer cells, and pancreatic cancer cell. The TNBC cells include the MDA-MB-231 cell and MDA-MB-231 HLA-Gov cell, the glioblastoma multiforme cells include GBM-8901 cell and DBTRG-05 MG cell, the lung cancer cells include A549 cell and H1975 cell, the ovarian cancer cells include SKOV3 cell and SKOV3 HLA-Gov cell, and the pancreatic cancer cell includes AsPC1 cell. The MDA-MB-231 HLA-Gov cell is a MDA-MB-231 cell line that stably overexpresses HLA-G, which is obtained by transfecting with pCMV1 plasmid encoding HLA-G into the MDA-MB-231 cell line using Lipofectamine™ 3000 (Invitrogen). The SKOV3 HLA-Gov cell is a SKOV3 cell lines that stably overexpresses HLA-G, which is obtained by transfecting with pCMV1 plasmid encoding HLA-G into the SKOV3 cell line using Lipofectamine™ 3000.

In addition, Example 4 or the parental cell are used as effector cells, and the effector cells and the tumor cells are cocultured at 37° C. at effector cell/tumor cell (E:T) ratio of 1:1, 2:1, 3:1, 6:1 or 10:1. All tumor cells are stained with green-fluorescent calcein-AM with before coculture, and then stained with red-fluorescent ethidium homodimer-1 after 48 hours of coculture. A LIVE/DEAD cell-mediated cytotoxicity assay is performed using flow cytometry to determine the specific lysis to the tumor cells by Example 4.

Figure 13B:
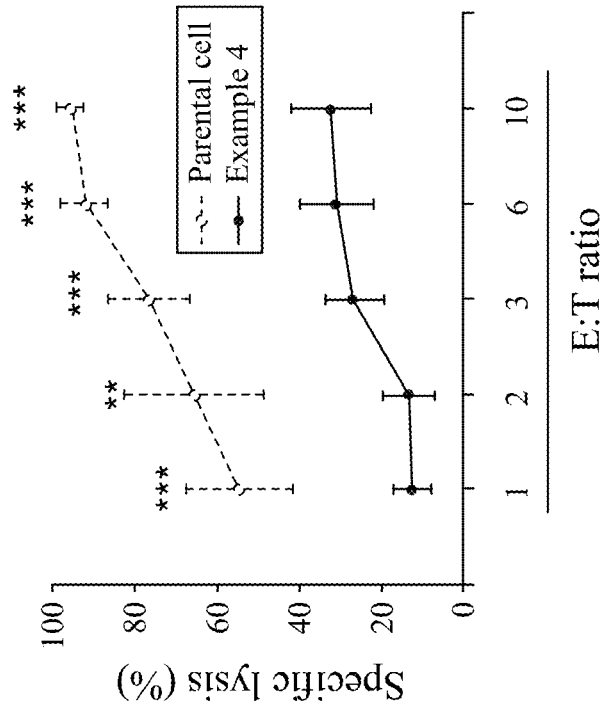
FIGS. 13A, 13B, 14A, 14B, 15A, 15B, 16A, 16B and 17 show analytical results of the specific lysis to tumor cells by the multispecific single domain antibodies chimeric antigen receptor and T-cell engager expressing cell of Example 4 of the present disclosure.
Figure 13A:
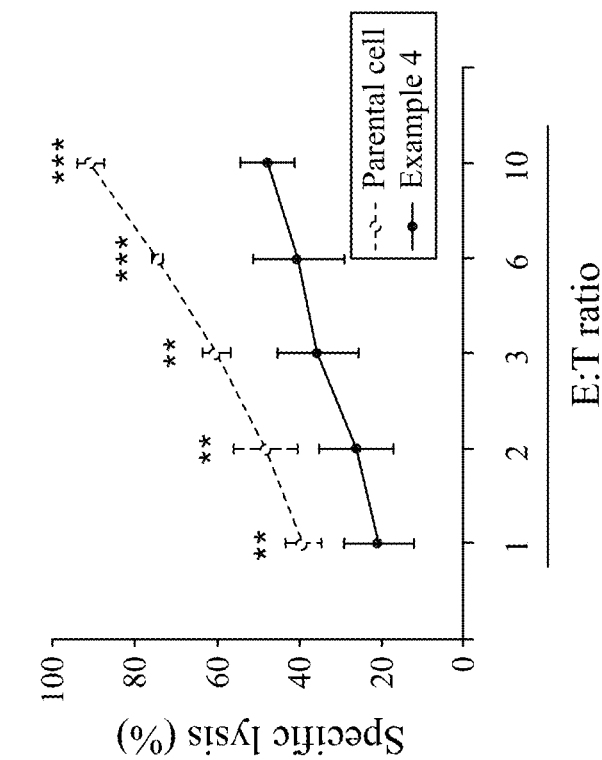
Figure 14B:
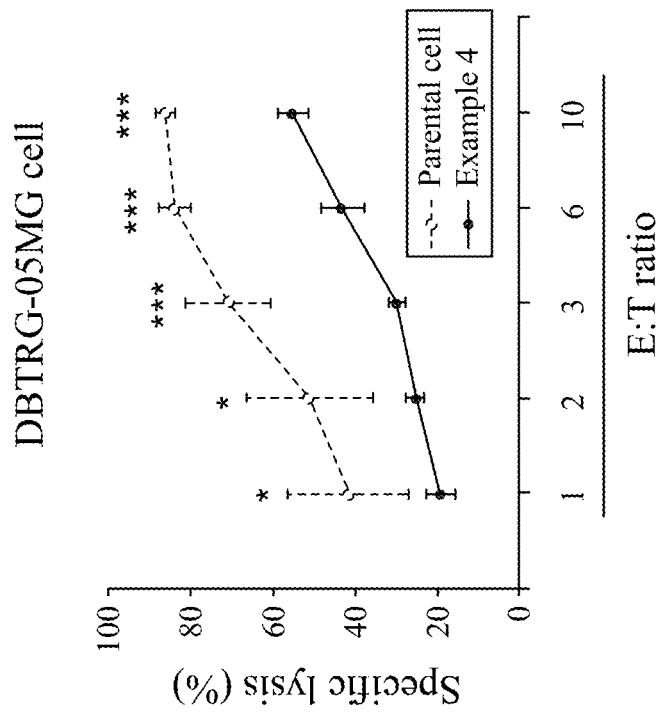
Figure 14A:
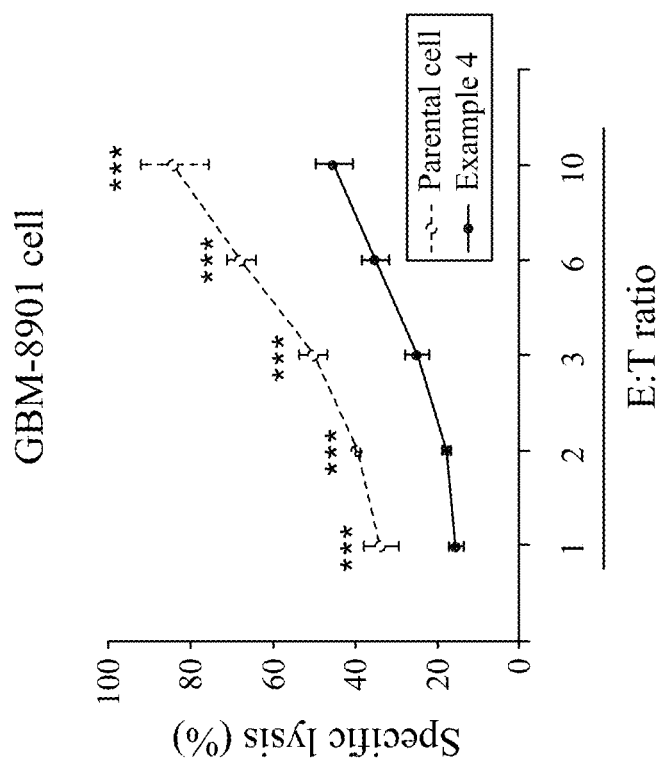
Figure 15B:
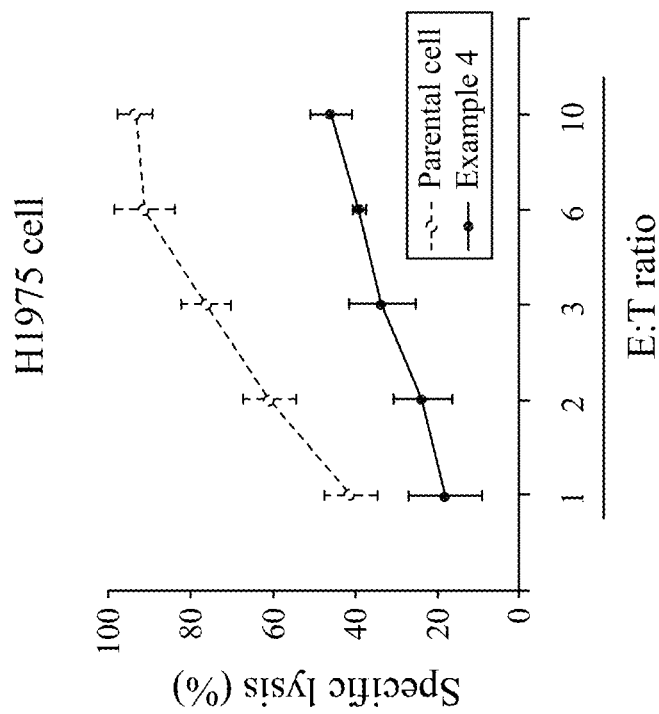
Figure 15A:
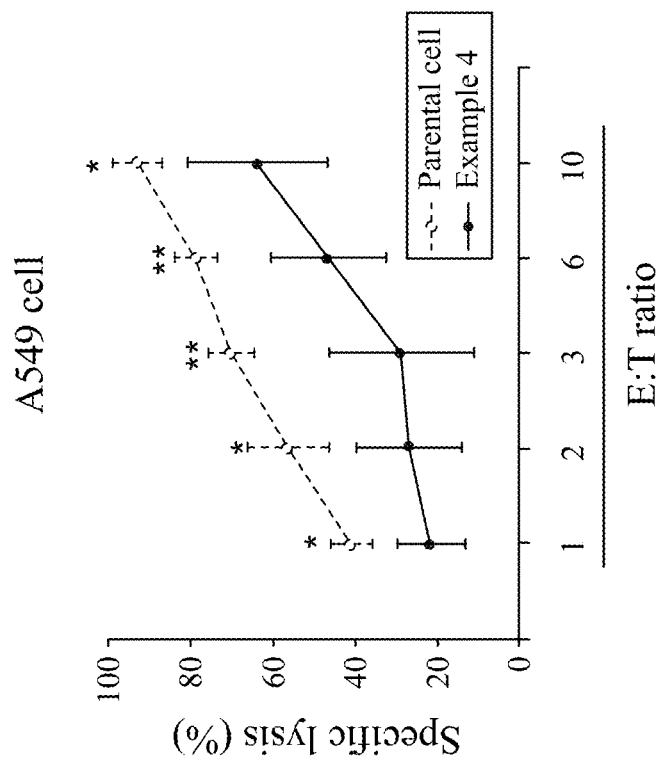
Figure 16B:
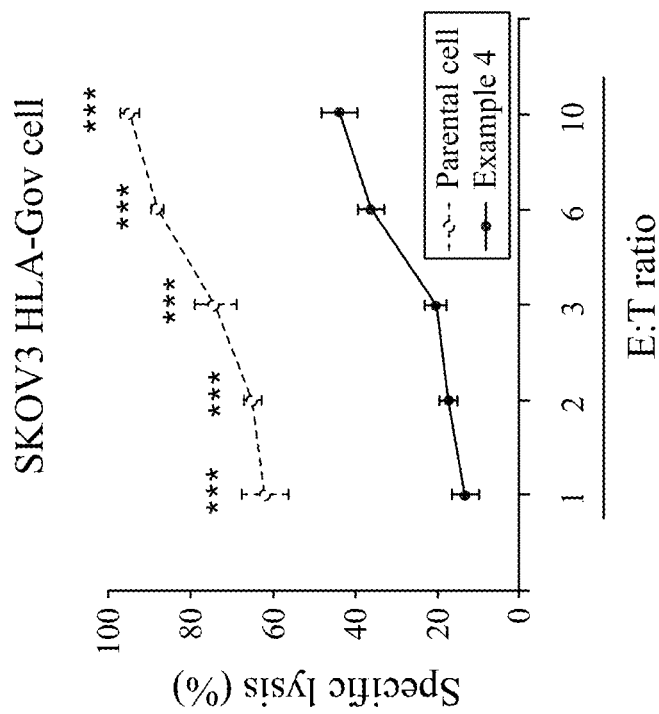
Figure 16A:
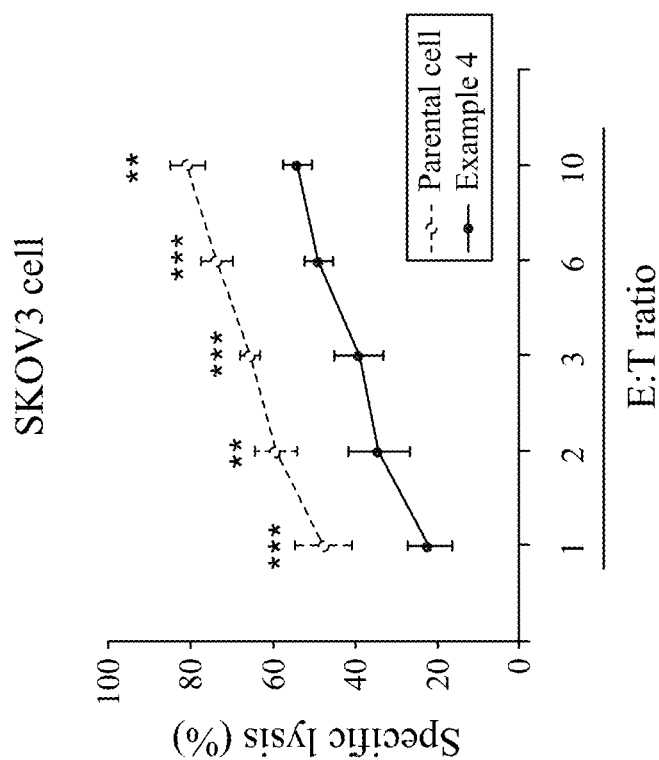
Figure 17:
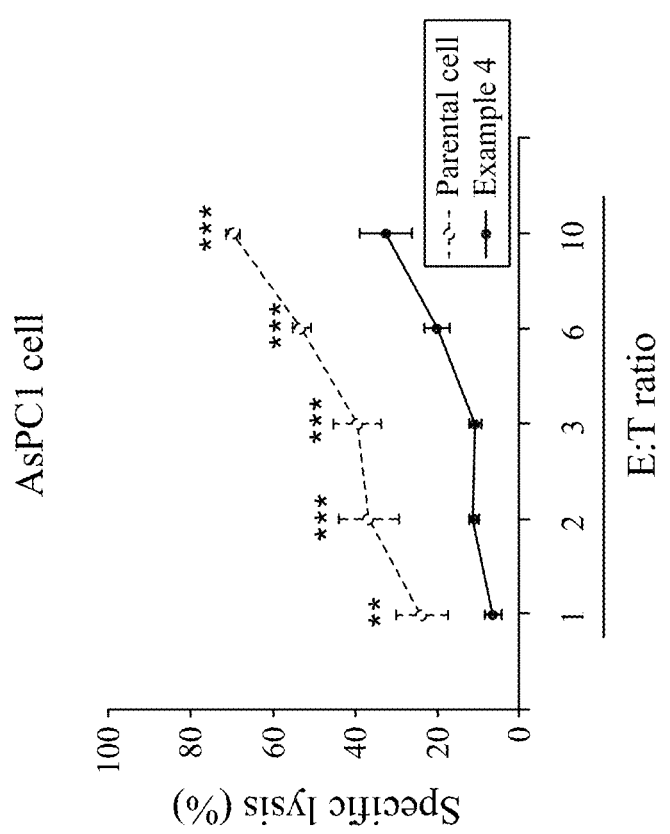

Please refer to FIGS. 13A, 13B, 14A, 14B, 15A, 15B, 16A, 16B and 17, which show analytical results of the specific lysis to the tumor cells by the multispecific single domain antibodies chimeric antigen receptor and T-cell engager expressing cell of Example 4 of the present disclosure. The tumor cells analyzed in FIGS. 13A and 13B are the MDA-MB-231 cell and the MDA-MB-231 HLA-Gov cell, the tumor cells analyzed in FIGS. 14A and 14B are the GBM-8901 cell and the DBTRG-05 MG cell, the tumor cells analyzed in FIGS. 15A and 15B are the A549 cell and the H1975 cell, the tumor cells analyzed in FIGS. 16A and 16B are the SKOV3 cell and the SKOV3 HLA-Gov cell, and the tumor cell analyzed in FIG. 17 is the AsPC1 cell. In FIGS. 13A to 17, * represents $p<0.05$,  represents $p<0.01$, and * represents $p<0.001$.

The results in FIGS. 13A and 13B show that, compared with the parental cell, Example 4 can enhance the effects on specific lysis to the MDA-MB-231 cell and the MDA-MB-231 HLA-Gov cell at the E:T ratio of 1:1, 2:1, 3:1, 6:1 and 10:1, and the differences are statistically significant. The results in FIGS. 14A and 14B show that, compared with the parental cell, Example 4 can enhance the effects on specific lysis to the GBM-8901 cell and the DBTRG-05 MG cell at the E:T ratio of 1:1, 2:1, 3:1, 6:1 and 10:1, and the differences are statistically significant. The results in FIGS. 15A and 15B show that, compared with the parental cell, Example 4 can enhance the effects on specific lysis to the A549 cell and the H1975 cell at the E:T ratio of 1:1, 2:1, 3:1, 6:1 and 10:1, and the differences are statistically significant. The results in FIGS. 16A and 16B show that, compared with the parental cell, Example 4 can enhance the effects on specific lysis to the SKOV3 cell and the SKOV3 HLA-Gov cell at the E:T ratio of 1:1, 2:1, 3:1, 6:1 and 10:1, and the differences are statistically significant. The results in FIG. 17 show that, compared with the parental cell, Example 4 can enhance the effects on specific lysis to the AsPC1 cell at the ET ratio of 1:1, 2:1, 3:1, 6:1 and 10:1, and the differences are statistically significant. The above results indicate that the multispecific single domain antibodies chimeric antigen receptor and T-cell engager expressing cell of the present disclosure has excellent cytotoxicity against the TNBC cells, the glioblastoma multiforme cells, the lung cancer cells, the ovarian cancer cells or the pancreatic cancer cell.

Figure 18:
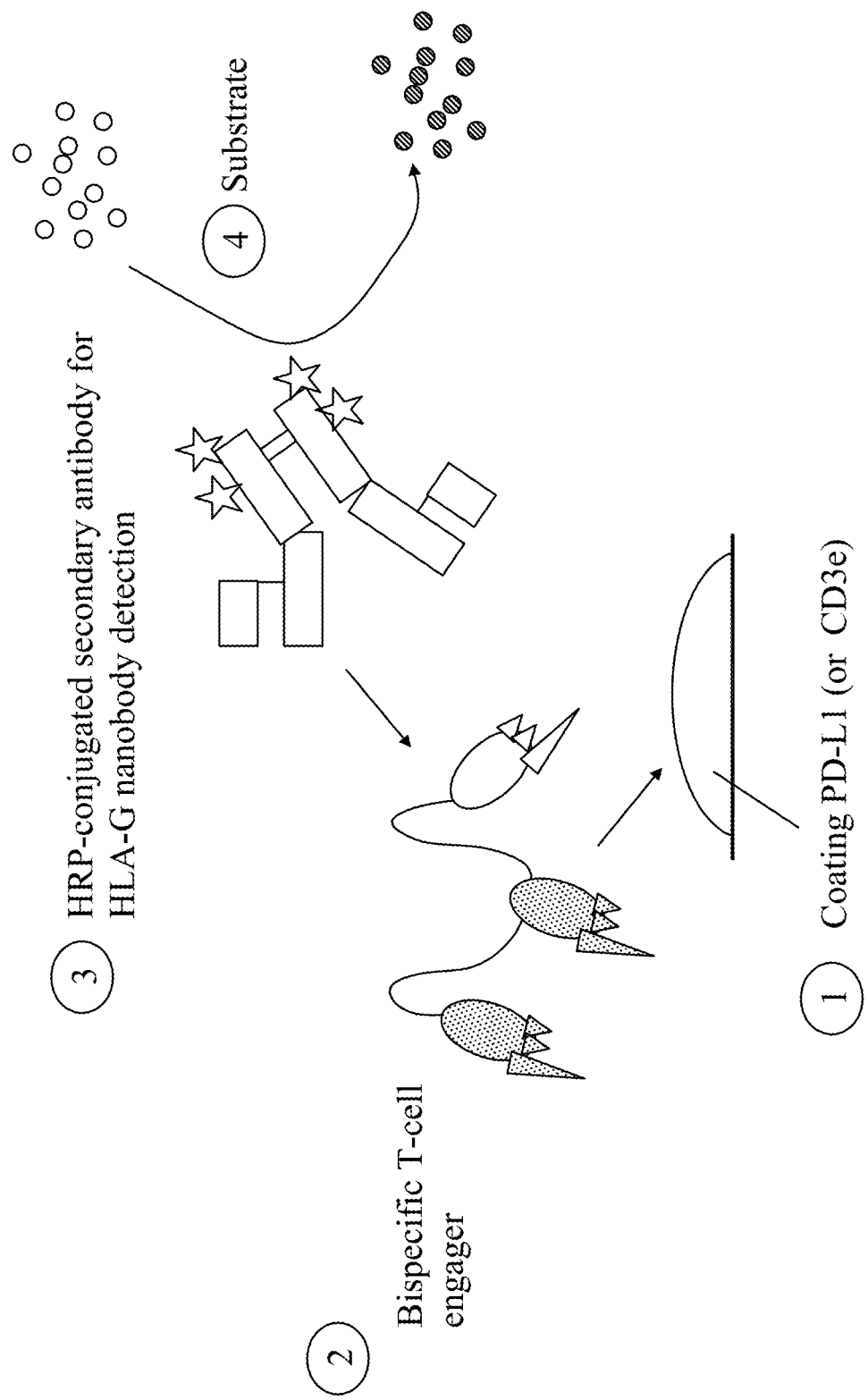
FIG. 18 is a schematic diagram showing the mechanism of action of the multispecific single domain antibodies chimeric antigen receptor and T-cell engager expressing cell of the present disclosure to secrete the multispecific single domain antibodies chimeric antigen receptor and T-cell engager.

Please refer to FIG. 18 and FIG. 1, FIG. 18 is a schematic diagram showing the mechanism of action of the multispecific single domain antibodies chimeric antigen receptor and T-cell engager expressing cell of the present disclosure to secrete the multispecific single domain antibodies chimeric antigen receptor and T-cell engager. The multispecific single domain antibodies chimeric antigen receptor and T-cell engager of the present disclosure has a P2A peptide between the HLA-G single domain antibody chimeric antigen receptor and the bispecific T-cell engager for self-cleavage, so when the multispecific single domain antibodies chimeric antigen receptor and T-cell engager expressing cell expresses the multispecific single domain antibodies chimeric antigen receptor and T-cell engager, the bispecific T-cell engager can be cleaved and secreted extracellularly.

To test the secretion status of the bispecific T-cell engager in the multispecific single domain antibodies chimeric antigen receptor and T-cell engager expressing cell of the present disclosure, the parental cell, Example 3 or Example 4 are seeded in PD-L1-coated 12-well plate at the E:T ratio of 3:1. After 48 hours of coculture, the secretion of the bispecific T-cell engager is detected with anti-CD3 antibody.

Figure 19:
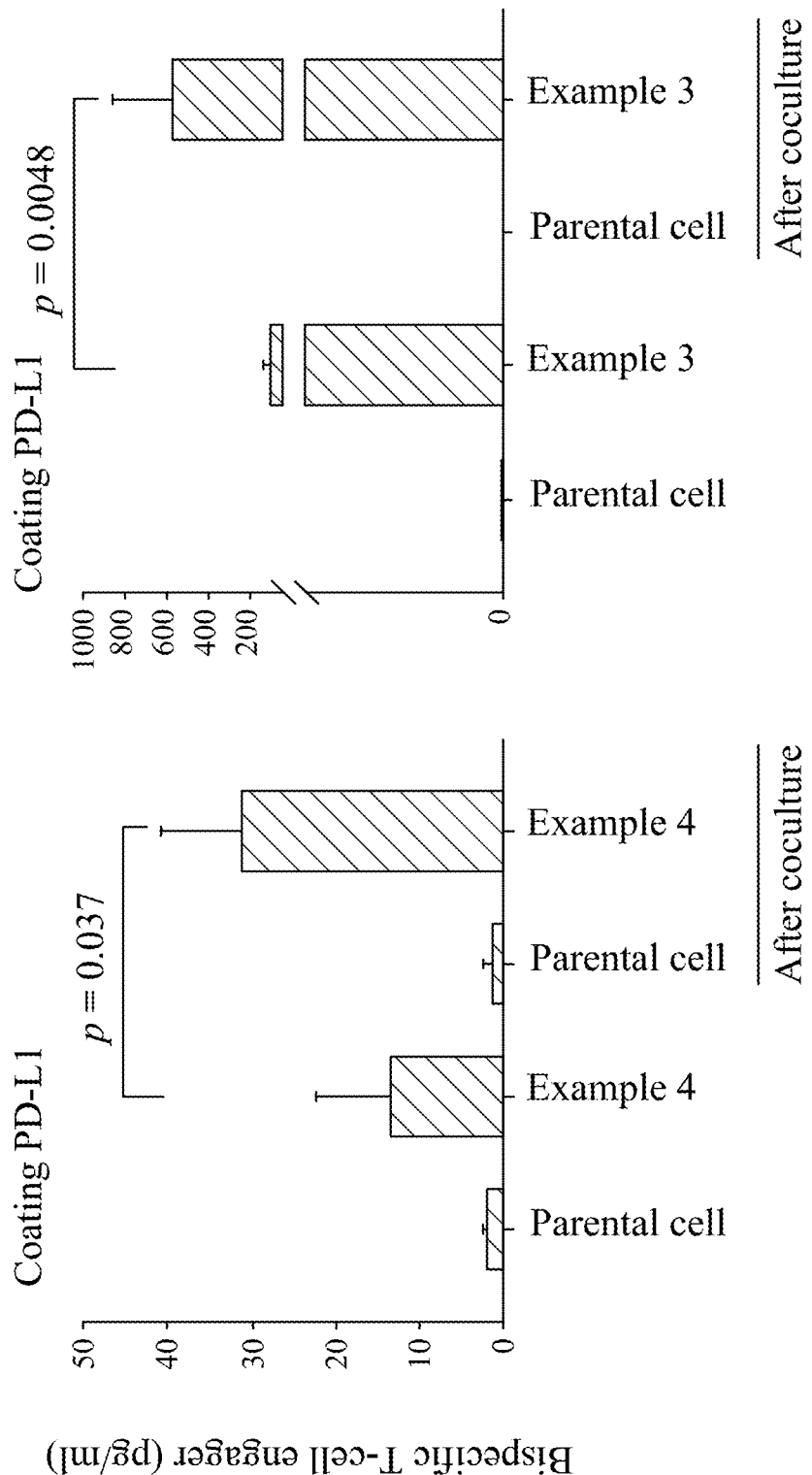
FIG. 19 shows analytical results of the multispecific single domain antibodies chimeric antigen receptor and T-cell engager expressing cells of the present disclosure secreting the bispecific T-cell engagers.

Please refer to FIG. 19, which shows analytical results of the multispecific single domain antibodies chimeric antigen receptor and T-cell engager expressing cells of the present disclosure secreting the bispecific T-cell engagers. In FIG. 19, compared with the data before coculture, both Example 3 and Example 4 can increase the secretion of the bispecific T-cell engager after coculture with the MDA-MB-231 cell. The results indicate that the bispecific T-cell engager secreted by the multispecific single domain antibodies chimeric antigen receptor and T-cell engager expressing cell of the present disclosure is detectable.

The cytotoxicity of the multispecific single domain antibodies chimeric antigen receptor and T-cell engager released by the multispecific single domain antibodies chimeric antigen receptor and T-cell engager expressing cell of the present disclosure on the tumor cells are further evaluated by using a cell-impermeable transwell membrane (with a pore size of 0.4 μm). The effector cell (the PBMC) and/or the tumor cell (the GBM-8901 cell or the DBTRG-05 MG cell) are seeded at the bottom of 12-well plates at the E:T ratio of 5:1, and then $5 \times 10^5$ of Example 3, the parental cell or Comparative Example 2 are added into the headspace with or without cell-impermeable transwell membrane. At indicated time points, bottom cells are performed to the LIVE/DEAD cell-mediated cytotoxicity assay and analyzed by flow cytometry.

Figure 20A:
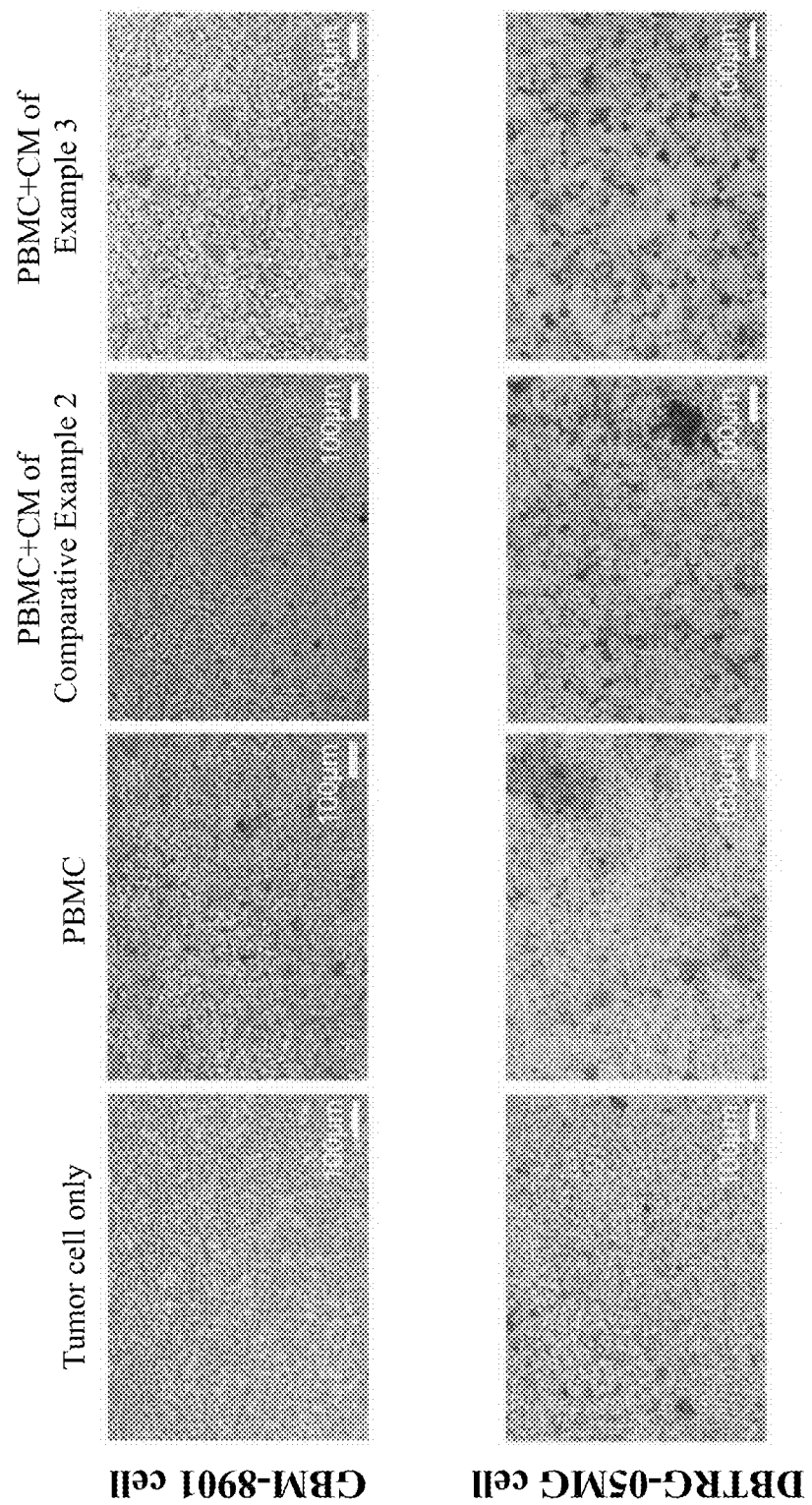
FIGS. 20A, 20B and 20C show analytical results of effects of a PBMC-induced cytotoxicity on glioblastoma multiforme cells enhanced by a conditioned medium of the multispecific single domain antibodies chimeric antigen receptor and T-cell engager expressing cell of the present disclosure.
Figure 20C:
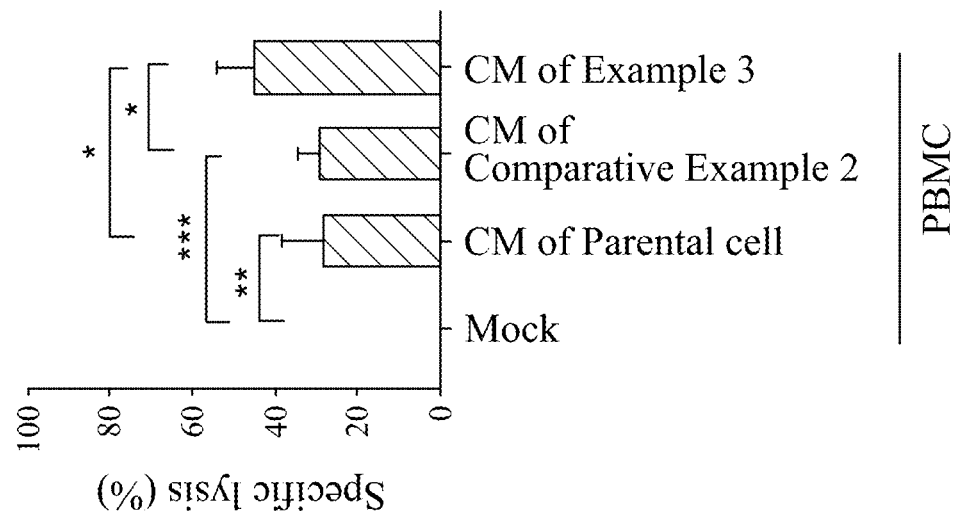
Figure 20B:
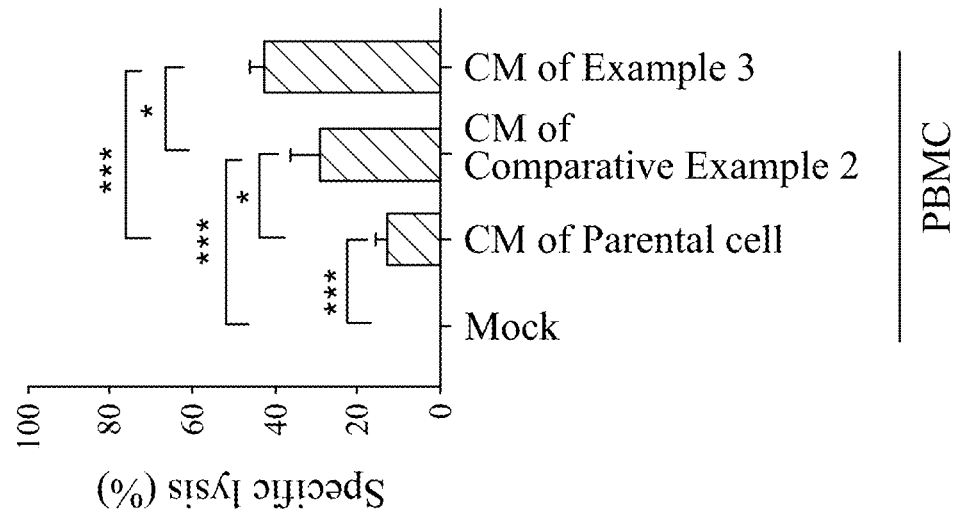

Please refer to FIGS. 20A, 20B and 20C, which show analytical results of effects of the PBMC-induced cytotoxicity on glioblastoma multiforme cells enhanced by the conditioned medium (CM) of Example 3, the parental cell or Comparative Example 2. FIG. 20A is a photomicrograph, FIG. 20B and FIG. 20C are the statistical results of FIG. 20A, and * represents $p<0.05$,  represents $p<0.01$, and * represents $p<0.001$. In FIGS. 20A and 20B, compared with the untreated Mock group, the conditioned medium of the parental cell, Comparative Example 2 and Example 3 all enhance the PBMC-induced cytotoxicity, which in turn triggered the specific lysis to the GBM-8901 cell. However, the PBMC-induced cytotoxicity enhanced by the conditioned medium of Example 3 is significantly better than that of other groups, whether compared with the parental cell or Comparative Example 2, and the differences are statistically significant ($p<0.001$ and $p<0.05$). In FIG. 20A and FIG. 20C, compared with the untreated Mock group, the conditioned medium of the parental cell, Comparative Example 2 and Example 3 all enhance the PBMC-induced cytotoxicity, which in turn triggered the specific lysis to the DBTRG-05 MG cell. However, the PBMC-induced cytotoxicity enhanced by the conditioned medium of Example 3 is significantly better than that of other groups, whether compared with the parental cell or Comparative Example 2, and the differences are statistically significant ($p<0.05$ and $p<0.05$). The above results indicate that the multispecific single domain antibodies chimeric antigen receptor and T-cell engager expressing cell of the present disclosure can indeed secrete the bispecific T-cell engager into the cell culture medium, thereby enhancing the cytotoxicity of the effector cell to the tumor cell and triggering specific lysis.

Figure 21A:
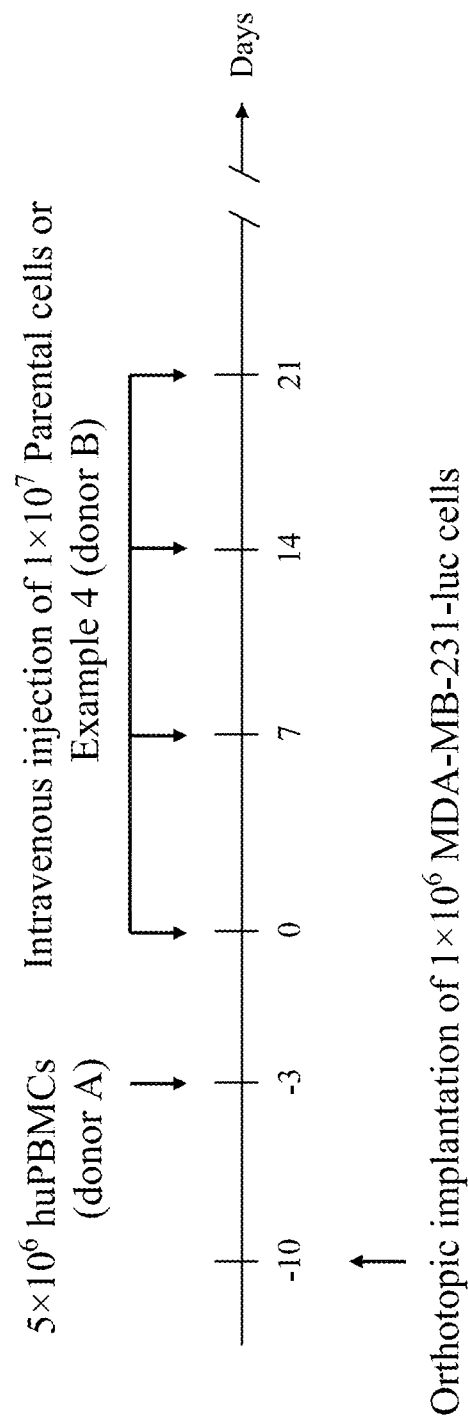
FIG. 21A is a schematic diagram showing an experimental strategy for animal treatment of the multispecific single domain antibodies chimeric antigen receptor and T-cell engager expressing cell of the present disclosure.

To further test whether the multispecific single domain antibodies chimeric antigen receptor and T-cell engager expressing cell has the effect of treating cancer, please refer to FIG. 21A, which is a schematic diagram showing an experimental strategy for animal treatment of the multispecific single domain antibodies chimeric antigen receptor and T-cell engager expressing cell of the present disclosure. An orthotopic xenograft breast tumor PBMC-huNGS mouse model is established 10 days before the experiment (Day −10), and $1\times10^6$ MDA-MB-231-luc cells are subcutaneously injected into the left fourth mammary gland of female NGS mice. 7 days after implantation (Day −3), $5\times10^6$ huPBMCs are injected into NGS mice by tail vein injection to establish the orthotopic xenograft breast tumor PBMC-huNGS mouse model (hereinafter referred to as "tumor mice"). After another 3 days (Day 0), the treatment is started. The treatment method is to inject $1\times10^7$ parental cells or Example 4 into the tumor mice by tail vein, and additional infusion ($1\times10^7$ parental cells or Example 4) of will be started after the first infusion for three times once a week for three weeks (Day 7, Day 14 and Day 21). During the treatment process, the tumor growth of the tumor mice is monitored weekly using an in vivo imaging system (IVIS Spectrum, PerkinElmer), and the monitoring time points are on Day 0, Day 7, Day 14, Day 21, Day 28, Day 35, Day 42, Day 49, Day 56, Day 63, Day 70, Day 77 and Day 84. In addition, the survival rate of the tumor mice is analyzed by Kaplan-Meier survival curve.

Figure 21B:
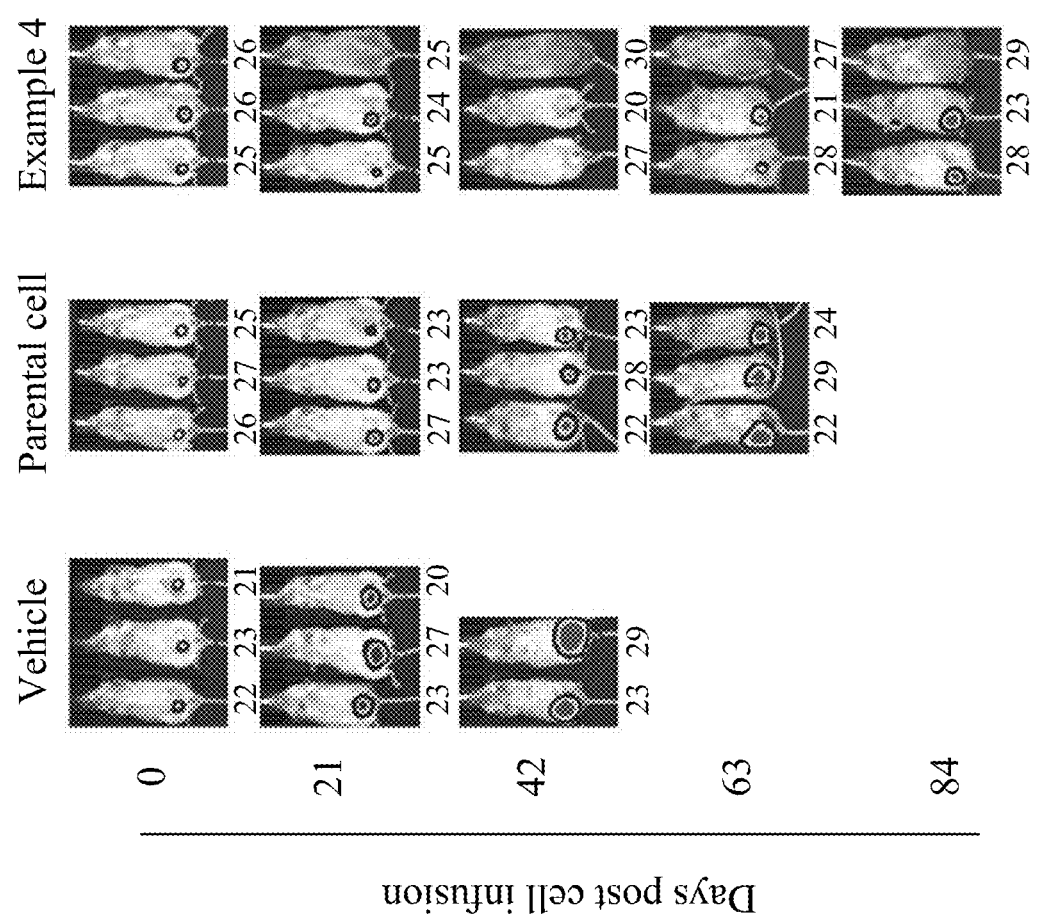
FIGS. 21B, 21C and 21D show analytical results of effects of the multispecific single domain antibodies chimeric antigen receptor and T-cell engager expressing cell of the present disclosure on tumor growth inhibition in tumor mice.
Figure 21D:
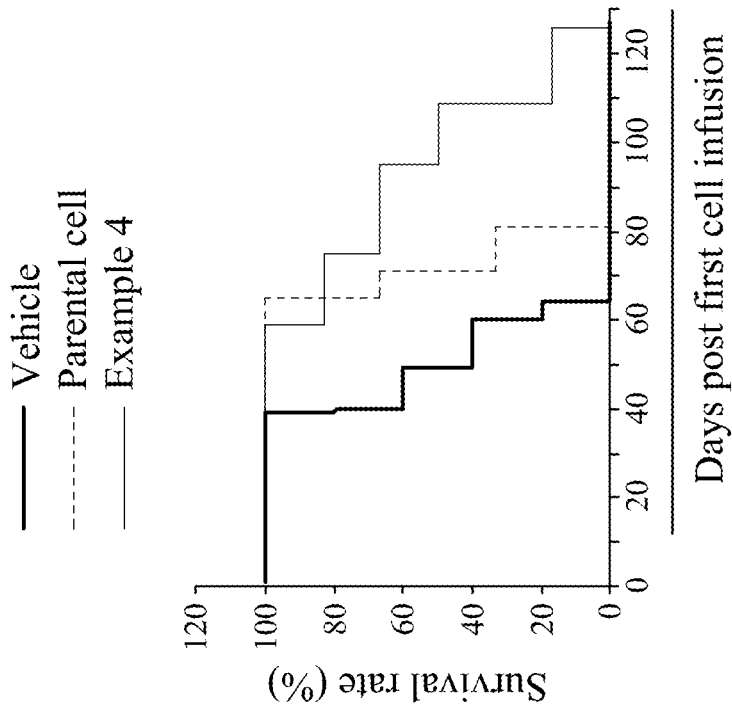
Figure 21C:
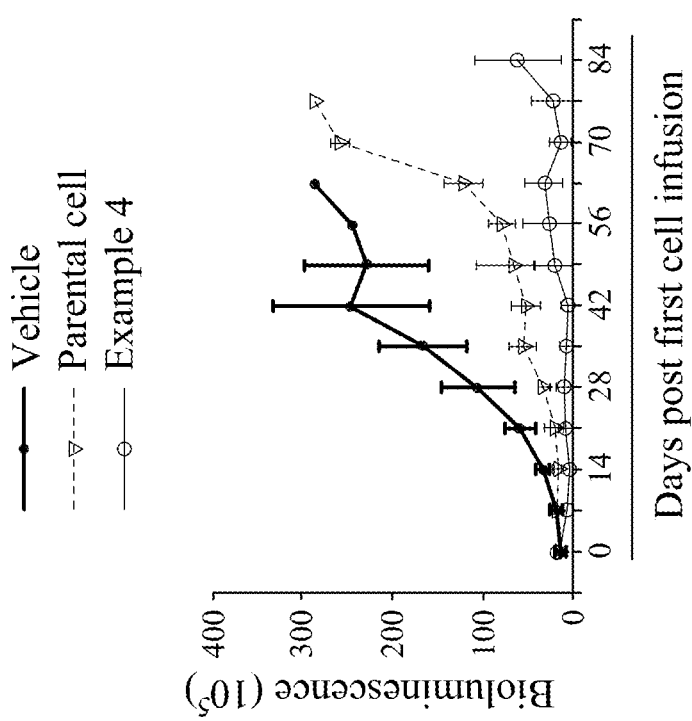

Please refer to FIGS. 21B, 21C and 21D, which show analytical results of effects of the multispecific single domain antibodies chimeric antigen receptor and T-cell engager expressing cell of the present disclosure on tumor growth inhibition in the tumor mice. FIG. 21B is an image of IVIS, and the numbers under the photo are the numbers of the tumor mice in the experimental group. FIG. 21C shows the amount of bioluminescence in each group of the tumor mice at each monitoring time point, and the amount of bioluminescence is proportional to the size of the tumor. FIG. 21D is the Kaplan-Meier survival curve of the tumor mice in each group.

In FIGS. 21B to 21D, the tumors of the untreated tumor mice (hereinafter referred to as "vehicle group") began to grow gradually on Day 0, and all the tumor mice in the vehicle group (n=6) had died on Day 63. Compared with the vehicle group, the tumor mice treated with the parental cell (hereafter referred to as "parental cell group") had a slower tumor growth rate, but the tumor size also increased with time from Day 0, and all the tumor mice in the parental cell group (n=6) had died on Day 81. On the other hand, the tumor mice treated with Example 4 (hereinafter referred to as "Example 4 group"), their tumor size were controlled, even in 2 of 6 tumor mice in the Example 4 group had no residual tumor signal was detected on Day 84, and the survival days of one of them can be extended to Day 128. The above results indicate that the multispecific single domain antibodies chimeric antigen receptor and T-cell engager expressing cell of the present disclosure can increase the tumor suppressing effect and effectively prolong the survival time of orthotopic xenografted breast tumor PBMC-huNGS mice.

To sum up, the multispecific single domain antibodies chimeric antigen receptor and T-cell engager of the present disclosure specifically binds to the HLA-G expressed on the cell membrane of the tumor cell. Therefore, the multispecific single domain antibodies chimeric antigen receptor and T-cell engager expressing cell of the present disclosure expressing the multispecific single domain antibodies chimeric antigen receptor and T-cell engager can specifically target the tumor cell and avoid off-target effects. In addition, the multispecific single domain antibodies chimeric antigen receptor and T-cell engager of the present disclosure includes the bispecific T-cell engager that can specifically recognize the CD3 molecule on the surface of the T cell and the PD-L1 on the surface of the tumor cell, and can simultaneously activate the T cell and block the activation of immune checkpoints, thereby effectively killing the tumor cell. Therefore, the multispecific single domain antibodies chimeric antigen receptor and T-cell engager expressing cell of the present disclosure expressing can be used to prepare drugs for inhibiting the proliferation of the tumor cell. The pharmaceutical composition for treating cancer including the multispecific single domain antibodies chimeric antigen receptor and T-cell engager expressing cell of the present disclosure can effectively kill the tumor cell and then treat cancer. It is confirmed by experimental data that the multispecific single domain antibodies chimeric antigen receptor and T-cell engager expressing cell of the present disclosure has excellent effect of inhibiting tumor progression in animal models, and has the potential to be used in the biomedical and healthcare market.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A multispecific single domain antibodies chimeric antigen receptor and T-cell engager comprising:
  an HLA-G single domain antibody chimeric antigen receptor comprising, in order from an N-terminus to a C-terminus:
    an HLA-G single domain antibodies unit specifically binding to human leukocyte antigen G (HLA-G) comprising at least one HLA-G single domain antibody, wherein the at least one HLA-G single domain antibody comprises the amino acid sequence of SEQ ID NO: 1 and/or the amino acid sequence of SEQ ID NO: 2;
    a transmembrane domain comprising the amino acid sequence of SEQ ID NO: 19, the amino acid sequence of SEQ ID NO: 21, the amino acid sequence of SEQ ID NO: 23 or the amino acid sequence of SEQ ID NO: 29; and
    a CD3z signaling domain comprising the amino acid sequence of SEQ ID NO: 25; and
  a bispecific T-cell engager linked to the C-terminus of the HLA-G single domain antibody chimeric antigen receptor comprising, in order from an N-terminus to a C-terminus:
    a PD-L1 single domain antibodies unit specifically binding to programmed death-ligand 1 (PD-L1) comprising at least one PD-L1 single domain antibody, wherein the at least one PD-L1 single domain antibody comprises the amino acid sequence of SEQ ID NO: 5 and/or the amino acid sequence of SEQ ID NO: 6; and
    a CD3e specifically binding to CD3 epsilon (CD3e) comprising the amino acid sequence of SEQ ID NO: 9.

2. The multispecific chimeric antigen receptor and T-cell engager of claim 1, further comprising a first signal peptide, wherein the first signal peptide is linked to the N-terminus of the HLA-G single domain antibody chimeric antigen receptor and comprises the amino acid sequence of SEQ ID NO: 11.

3. The multispecific single domain antibodies chimeric antigen receptor and T-cell engager of claim 1, further comprising a CD8 hinge region, wherein the CD8 hinge region links the HLA-G single domain antibodies unit and the transmembrane domain.

4. The multispecific single domain antibodies chimeric antigen receptor and T-cell engager of claim 1, further comprising a P2A peptide, wherein the P2A peptide links the HLA-G single domain antibody chimeric antigen receptor and the bispecific T-cell engager.

5. The multispecific single domain antibodies chimeric antigen receptor and T-cell engager of claim 1, further comprising a second signal peptide, wherein the second signal peptide is linked to the N-terminus of the bispecific T-cell engager and comprises the amino acid sequence of SEQ ID NO: 15.

6. The multispecific single domain antibodies chimeric antigen receptor and T-cell engager of claim 1, wherein the HLA-G single domain antibodies unit blocks an interaction and/or binding of the HLA-G with an HLA-G receptor.

7. The multispecific single domain antibodies chimeric antigen receptor and T-cell engager of claim 6, wherein the HLA-G receptor is KIR2DL4 or LILRB1.

8. The multispecific single domain antibodies chimeric antigen receptor and T-cell engager of claim 1, wherein the PD-L1 single domain antibodies unit blocks an interaction and/or binding of the PD-L1 with a PD-L1 receptor.

9. The multispecific single domain antibodies chimeric antigen receptor and T-cell engager of claim 8, wherein the PD-L1 receptor is programmed cell death protein-1 (PD-1).

10. The multispecific single domain antibodies chimeric antigen receptor and T-cell engager of claim 1, wherein the CD3e single domain antibody activates and/or recruits T cells.

11. A nucleic acid encoding the multispecific single domain antibodies chimeric antigen receptor and T-cell engager of claim 1, comprising:
  an HLA-G single domain antibody chimeric antigen receptor coding fragment comprising, in order from a 5' end to a 3' end:
    an HLA-G single domain antibodies unit coding fragment comprising at least one HLA-G single domain antibody coding fragment, wherein the at least one HLA-G single domain antibody coding fragment comprises the nucleic acid sequence of SEQ ID NO: 3 and/or the nucleic acid sequence of SEQ ID NO: 4;
    a transmembrane domain coding fragment comprising the nucleic acid sequence of SEQ ID NO: 20, the nucleic acid sequence of SEQ ID NO: 22, the nucleic acid sequence of SEQ ID NO: 24 or the nucleic acid sequence of SEQ ID NO: 30; and
    a CD3z signaling domain coding fragment comprising the nucleic acid sequence of SEQ ID NO: 26; and
  a bispecific T-cell engager coding fragment linked to the 3' end of the HLA-G single domain antibody chimeric antigen receptor coding fragment comprising, in order from a 5' end to a 3' end:
    a PD-L1 single domain antibodies unit coding fragment comprising at least one PD-L1 single domain antibody coding fragment, wherein the at least one PD-L1 single domain antibody coding fragment comprises the nucleic acid sequence of SEQ ID NO: 7 and/or the nucleic acid sequence of SEQ ID NO: 8; and a CD3e single domain antibody coding fragment comprising the nucleic acid sequence of SEQ ID NO: 10.

12. A multispecific single domain antibodies chimeric antigen receptor and T-cell engager expressing cell, comprising:
   an immune cell; and
   the nucleic acid of claim 11;
   wherein the multispecific single domain antibodies chimeric antigen receptor and T-cell engager expressing cell is obtained by transducing the nucleic acid into the immune cell.

13. The multispecific single domain antibodies chimeric antigen receptor and T-cell engager expressing cell of claim 12, wherein the immune cell is a natural killer (NK) cell or a γδT cell.

14. A pharmaceutical composition for treating cancer, comprising:
   the multispecific single domain antibodies chimeric antigen receptor and T-cell engager expressing cell of claim 12; and
   a pharmaceutically acceptable carrier.

15. A method for inhibiting a proliferation of a tumor cell comprising administering a composition comprising a plurality of the multispecific single domain antibodies chimeric antigen receptor and T-cell engager expressing cells of claim 12 to a subject in need for a treatment of a tumor.

* * * * *

SEQUENCE LISTING

Sequence total quantity: 30
SEQ ID NO: 1           moltype = AA  length = 124

```
FEATURE                 Location/Qualifiers
source                  1..124
                        mol_type = protein
                        organism = synthetic construct
SEQUENCE: 1
EVQLVESGGG SVQAGGSLRL SCDASKYTYF RNCMGWFRQV PGAEREGVAT IDSAGGTSYA    60
DFVKGRFTIS RDNAKTALYL QMNSLKPEDT AMYYCFGGSW YKGSCIYEYN YWGQGTQVTV   120
SSVD                                                                124

SEQ ID NO: 2            moltype = AA   length = 154
FEATURE                 Location/Qualifiers
source                  1..154
                        mol_type = protein
                        organism = synthetic construct
SEQUENCE: 2
MKYLLPTAAA GLLLLAAQPA MAMGEVQLVE SGGGSVQAGG SLRLSCDASK YTYFRNCMGW    60
FRQVPGAERE GVATIDSAGG TSYADFVKGR FTISRDNAKT ALYLQMNSLK PEDTAMYYCF   120
GGSWYKGSCI YEYNYWGQGT QVTVSSLEHH HHHH                               154

SEQ ID NO: 3            moltype = DNA   length = 408
FEATURE                 Location/Qualifiers
source                  1..408
                        mol_type = other DNA
                        organism = synthetic construct
SEQUENCE: 3
atgggaagat ctgagctcga agttcagctg gttgaaagtg gtggcggtag cgtgcaggca    60
ggtggtagcc tgcgcctgag ttgtgatgcc agtaaatata cctacttccg taattgtatg   120
ggttggttcc gtcaggttcc gggcgccgaa cgcgaaggtg ttgcaaccat tgatagtgca   180
ggcggcacca gttatgccga cttcgttaaa ggtcgcttca ccattagccg tgataatgcc   240
aaaaccgcac tgtatctgca gatgaatagt ctgaaaccgg aagataccgc aatgtattat   300
tgcttcggcg gcagttggta taaaggtagc tgtatctatg aatataacta ctggggtcag   360
ggtacccagg tgaccgttag cagcgtcgac catcatcatc atcatcat              408

SEQ ID NO: 4            moltype = DNA   length = 378
FEATURE                 Location/Qualifiers
source                  1..378
                        mol_type = other DNA
                        organism = synthetic construct
SEQUENCE: 4
atgggcgaag tgcagctggt tgaaagcggt ggtggcagcg ttcaggcagg tggcagtctg    60
cgcctgagtt gcgatgccag taaatatacc tacttccgca attgtatggg ctggttccgt   120
caggtgccgg gcgccgaacg cgaaggtgtg caaccattga tagcgccggt ggtaccagc   180
tatgccgact tcgtgaaagg tcgcttcacc attagccgcg ataatgccaa aaccgcactg   240
tatctgcaga tgaatagcct gaaaccggaa gataccgcca tgtattattg cttcggcggc   300
agctggtata aaggcagctg catctatgaa tataattatt ggggccaggg cacccaggtg   360
accgttagta gtctcgag                                                378

SEQ ID NO: 5            moltype = AA   length = 119
FEATURE                 Location/Qualifiers
source                  1..119
                        mol_type = protein
                        organism = synthetic construct
SEQUENCE: 5
EVQLVESGGG LVQPGGSLRL SCVASGFTFS SIGMSWVRQA PGKGLEWVSG LNPVGSHTGY    60
ADSVKGRFTI SRDNAKNTLH LQLNSLKTED TAMYYCQRGY TCSGDLCERG QGTQVTVSS   119

SEQ ID NO: 6            moltype = AA   length = 121
FEATURE                 Location/Qualifiers
source                  1..121
                        mol_type = protein
                        organism = synthetic construct
SEQUENCE: 6
HVQLVESGGG LVQPGGSLRL SCAASGFTFS SKAMSWVRQA PGKGLDWVST INSGGGNTYY    60
SDSVKGRFTI SRDNAKNTLY LQLNSLKTED TAMYYCSRCS DIYCGGQYTY RGQGTLVTVS   120
S                                                                  121

SEQ ID NO: 7            moltype = DNA   length = 357
FEATURE                 Location/Qualifiers
source                  1..357
                        mol_type = other DNA
                        organism = synthetic construct
SEQUENCE: 7
gaggtgcagc tggtggagtc tgggggaggc ttggtgcagc ctggggggtc tctgagactc    60
tcctgtgtag cctctggatt caccttcagt agcattggca tgagttgggt ccgccaggct   120
ccagggaagg ggctcgagtg ggtctcaggt ctgaatcctg ttggtagtca cacaggctat   180
gcagactccg taaagggccg attcaccatc tccagagaca acgccaagaa tacgctgcat   240
ctgcagttga acagcctgaa aactgaggac acggccatgt attactgtca aagaggttat   300
acttgtagcg gtgatttgtg cgaaggggt caggggaccc aggtcactgt ctcctca      357
```

```
SEQ ID NO: 8              moltype = DNA  length = 363
FEATURE                   Location/Qualifiers
source                    1..363
                          mol_type = other DNA
                          organism = synthetic construct
SEQUENCE: 8
catgtgcagc tggtggagtc tgggggaggc ttggtgcagc ctgggggtc tctgagactc        60
tcctgtgcag cctctggatt caccttcagt agcaaggcca tgagctgggt ccgccaggct      120
ccagggaagg gactcgactg ggtctcaacc attaatagtg gtggtggtaa cacatactat      180
tcagactccg tgaagggccg attcaccatc tccagagaca acgccaagaa cacgctgtat      240
ctgcaattga acagcctgaa aactgaggac acggccatgt attactgttc cgttgtagc       300
gatatttact gcggagggca atatacgtat cggggccagg ggaccctggt cactgtctcc      360
tca                                                                    363

SEQ ID NO: 9              moltype = AA  length = 128
FEATURE                   Location/Qualifiers
source                    1..128
                          mol_type = protein
                          organism = synthetic construct
SEQUENCE: 9
HVQLVESGGG SVQAGGSLRL SCTVSGVIFK NEYMGWFRQA PGKEREGVAA ASPGGTITYY        60
GDSVKGRFTI SRDNAKNTVY LQMNRLKPED TAMYYCALDP STTSWSIIRH GPSLWRYSGR      120
GTQVTVSS                                                               128

SEQ ID NO: 10             moltype = DNA  length = 384
FEATURE                   Location/Qualifiers
source                    1..384
                          mol_type = other DNA
                          organism = synthetic construct
SEQUENCE: 10
catgtgcagc tggtggagtc tgggggaggc tcggtgcagg ctgggggtc tctgagactc         60
tcctgtacag tgtctggagt catctttaag aacgagtaca tgggctggtt ccgccaggcc      120
ccagggaagg agcgcgaggg ggtcgcagca gcttcgcctg gtggaacgat tacatactat      180
ggggactccg tgaagggccg attcaccatc tcccgagaca atgccaagaa cacggtgtat      240
ctgcaaatga accgcctgaa acctgaggac actgccatgt actactgtgc cgttgatccc      300
tcgactacgt catggtctat catccgccac ggtccatcgc tttggcgtta tagcggccgg      360
gggacccagg tcaccgtctc ctca                                             384

SEQ ID NO: 11             moltype = AA  length = 21
FEATURE                   Location/Qualifiers
source                    1..21
                          mol_type = protein
                          organism = synthetic construct
SEQUENCE: 11
MALPVTALLL PLALLLHAAR P                                                 21

SEQ ID NO: 12             moltype = DNA  length = 63
FEATURE                   Location/Qualifiers
source                    1..63
                          mol_type = other DNA
                          organism = synthetic construct
SEQUENCE: 12
atggccctcc ctgtcaccgc cctgctgctt ccgctggctc ttctgctcca cgccgctcgg        60
ccc                                                                     63

SEQ ID NO: 13             moltype = AA  length = 15
FEATURE                   Location/Qualifiers
source                    1..15
                          mol_type = protein
                          organism = synthetic construct
SEQUENCE: 13
GGGGSGGGGS GGGGS                                                        15

SEQ ID NO: 14             moltype = DNA  length = 45
FEATURE                   Location/Qualifiers
source                    1..45
                          mol_type = other DNA
                          organism = synthetic construct
SEQUENCE: 14
ggaggcggag gttctggagg cggaggttct ggaggcggag gttct                       45

SEQ ID NO: 15             moltype = AA  length = 20
FEATURE                   Location/Qualifiers
source                    1..20
                          mol_type = protein
                          organism = synthetic construct
SEQUENCE: 15
MYRMQLLSCI ALSLALVTNS                                                   20
```

```
SEQ ID NO: 16              moltype = DNA   length = 60
FEATURE                    Location/Qualifiers
source                     1..60
                           mol_type = other DNA
                           organism = synthetic construct
SEQUENCE: 16
atgtacagga tgcaactcct gtcttgcatt gcactaagtc ttgcacttgt cacaaacagt    60

SEQ ID NO: 17              moltype = AA    length = 69
FEATURE                    Location/Qualifiers
source                     1..69
                           mol_type = protein
                           organism = synthetic construct
SEQUENCE: 17
TTTPAPRPPT PAPTIASQPL SLRPEACRPA AGGAVHTRGL DFACDIYIWA PLAGTCGVLL    60
LSLVITLYC                                                           69

SEQ ID NO: 18              moltype = DNA   length = 207
FEATURE                    Location/Qualifiers
source                     1..207
                           mol_type = other DNA
                           organism = synthetic construct
SEQUENCE: 18
accacgacgc cagcgccgcg accaccaaca ccggcgccca ccatcgcgtc gcagcccctg    60
tccctgcgcc cagaggcgtg ccggccagcg cgggggggcg cagtgcacac gagggggctg   120
gacttcgcct gtgatatcta catttgggcc cctctggctg gtacttgcgg ggtcctgctg   180
ctttcactcg tgatcactct ttactgt                                       207

SEQ ID NO: 19              moltype = AA    length = 126
FEATURE                    Location/Qualifiers
source                     1..126
                           mol_type = protein
                           organism = synthetic construct
SEQUENCE: 19
KVFLRCINYV FFPSLKPSSS IDEYFSEQPL KNLLLSTSEE QIERCFIIEN ISTIATVEET    60
NQTPVQTTQE EDGCSCRFPE EEEGGCELDE DHKKYSSQTS QDSGNYSNED ESESKTSEEL   120
QLVLDS                                                              126

SEQ ID NO: 20              moltype = DNA   length = 378
FEATURE                    Location/Qualifiers
source                     1..378
                           mol_type = other DNA
                           organism = synthetic construct
SEQUENCE: 20
aaagtcttct tgagatgcat caattatgtc ttctttccat cacttaaacc ttcttccagt    60
atagatgagt atttctctga acagccattg aagaatcttc tgctttcaac ttctgaggaa   120
caaatcgaaa gatgtttcat aattgaaaat ataagcacaa ttgctacagt agaagaaact   180
aatcaaactc cagtacaaac tactcaagag gaagatggct gtagctgccg atttccagaa   240
gaagaagaag gaggatgtga actggatgaa gatcataaaa aatacagttc ccaaactagc   300
caagattcag gaaattattc taatgaagat gaaagcgaaa gtaaaacaag tgaagaacta   360
cagctggtct tggactcc                                                 378

SEQ ID NO: 21              moltype = AA    length = 170
FEATURE                    Location/Qualifiers
source                     1..170
                           mol_type = protein
                           organism = synthetic construct
SEQUENCE: 21
MAAGGPGAGS AAPVSSTSSL PLAALNMRVR RRLSLFLNVR TQVAADWTAL AEEKKVAKKP    60
TNKAPHPKMD FEYLEIRQLE TQADPTGRLL DAWQGRPGAS VGRLLELLTK LGCDDVLLEL   120
GPSIEEDCQK YILKQQQEEA EKPLQVAAVD SSVPRTAELA GITTLDDPLG              170

SEQ ID NO: 22              moltype = DNA   length = 510
FEATURE                    Location/Qualifiers
source                     1..510
                           mol_type = other DNA
                           organism = synthetic construct
SEQUENCE: 22
atggctgcag gaggtcccgg cgcggggtct gcggccccgg tctcctccac atcctccctt    60
cccctggctg ctctcaacat gcgagtgcgg cgcgcctgt ctctgttctt gaacgtgcgg   120
acacaggtgg cggccgactg gaccgcgctg gcggaggaga aaaaggtggc caagaagcca   180
accaataagg cccccaccc caagatggac tttgagtact ggagatccg gcaactggag   240
acacaagcgg acccactgg caggctgctg gacgcctggc agggacgccc tggcgcctct   300
gtaggccgac tgctcgagct gcttaccaag ctgggctgcg acgacgtgct gctggagctg   360
ggacccagca ttgaggagga ttgccaaaag tatatcttga agcagcagca ggaggaggct   420
gagaagcctt tacaggtggc cgctgtagac agcagtgtcc cacggacagc agagctggcg   480
ggcatcacca cacttgatga ccccctgggg                                    510

SEQ ID NO: 23              moltype = AA    length = 218
```

| FEATURE | Location/Qualifiers |
|---|---|
| source | 1..218 |
| | mol_type = protein |
| | organism = synthetic construct |

SEQUENCE: 23

```
MAAGGPGAGS AAPVSSTSSL PLAALNMRVR RRLSLFLNVR TQVAADWTAL AEEKVFLRCI    60
NYVFFPSLKP SSSIDEYFSE QPLKNLLLST SEEQIERCFI IENISTIATV EETNQTMDFE   120
YLEIRQLETQ ADPTGRLLDA WQGRPGASVG RLLELLTKLG CDDVLLELGP SIEEDCQKYI   180
LKQQQEEAEK PLQVAAVDSS VPRTAELAGI TTLDDPLG                          218
```

| SEQ ID NO: 24 | moltype = DNA length = 654 |
|---|---|
| FEATURE | Location/Qualifiers |
| source | 1..654 |
| | mol_type = other DNA |
| | organism = synthetic construct |

SEQUENCE: 24

```
atggctgcag gaggtcccgg cgcggggtct gcggccccgg tctcctccac atcctccctt    60
cccctggctg ctctcaacat gcgagtgcgg cgccgcctgt ctctgttctt gaacgtgcgg   120
acacaggtgg cggccgactg gaccgcgctg gcggaggaga aagtcttctt gagatgcatc   180
aattatgtct tctttccatc acttaaacct tcttccagta tagatgagta tttctctgaa   240
cagccattga agaatcttct gctttcaact tctgaggaac aaatcgaaag atgtttcata   300
attggaaaata taagcacaat tgctacagta gaagaaacta atcaaactat ggactttgag   360
tacttggaga tccggcaact ggagacacaa gcggacccca ctggcaggct gctggacgcc   420
tggcagggac gccctggcgc ctctgtaggc cgactgctcg agctgcttac caagctgggc   480
tgcgacgacg tgctgctgga gctggggaccc agcattgagg aggattgcca aaagtatatc   540
ttgaagcagc agcaggagga ggctgagaag cctttacagg tggccgctgt agacagcagt   600
gtcccacgga cagcagagct ggcgggcatc accacacttg atgaccccct gggg          654
```

| SEQ ID NO: 25 | moltype = AA length = 145 |
|---|---|
| FEATURE | Location/Qualifiers |
| source | 1..145 |
| | mol_type = protein |
| | organism = synthetic construct |

SEQUENCE: 25

```
RVKFSRSADA PAYQQGQNQL YNELNLGRRE EYDVLDKRRG RDPEMGGKPQ RRKNPQEGLY    60
NELQKDKMAE AYSEIGMKGE RRRGKGHDGL YQGLSTATKD TYDALHMQYF LRKQRITETE   120
SPYQELQGQR SDVYSDLNTQ ALPPR                                        145
```

| SEQ ID NO: 26 | moltype = DNA length = 435 |
|---|---|
| FEATURE | Location/Qualifiers |
| source | 1..435 |
| | mol_type = other DNA |
| | organism = synthetic construct |

SEQUENCE: 26

```
agagtgaagt tcagcaggag cgcagacgcc cccgcgtacc agcagggcca gaaccagctc    60
tataacgagc tcaatctagg acgaagagag gagtacgatg ttttggacaa gagacgtggc   120
cgggaccctg agatgggggg aaagccgcag agaaggaaga agcctgtac                 180
aatgaactgc agaaagataa gatggcgag gcctacagtg agattgggat gaaaggcgag    240
cgccggaggg gcaaggggca cgatggcctt taccagggtc tcagtacagc caccaaggac   300
acctacgacg cccttcacat gcagtacttc ctgcggaaac agcgtatcac tgagaccgag   360
tcgccttatc aggagctcca gggtcagagg tcggatgtct cagcgacct caacacacag     420
gccctgcccc ctcgc                                                    435
```

| SEQ ID NO: 27 | moltype = AA length = 19 |
|---|---|
| FEATURE | Location/Qualifiers |
| source | 1..19 |
| | mol_type = protein |
| | organism = synthetic construct |

SEQUENCE: 27

```
ATNFSLLKQA GDVEENPGP                                                19
```

| SEQ ID NO: 28 | moltype = DNA length = 57 |
|---|---|
| FEATURE | Location/Qualifiers |
| source | 1..57 |
| | mol_type = other DNA |
| | organism = synthetic construct |

SEQUENCE: 28

```
gccacaaatt tcagcctgct gaaacaggcc ggcgacgtgg aagagaaccc tggacct      57
```

| SEQ ID NO: 29 | moltype = AA length = 132 |
|---|---|
| FEATURE | Location/Qualifiers |
| source | 1..132 |
| | mol_type = protein |
| | organism = synthetic construct |

SEQUENCE: 29

```
IISFFLALTS TALLFLLFPL TLRFSVVKRG RKKLLYIFKQ PFMRKVFLRC INYVFFPSLK    60
PSSSIDEYFS EQPLKNLLLS TSEEQIERCF IIENISTIAT VEETNQTPVQ TTQEEDGCSC   120
RFPEEEEGGC EL                                                      132
```

| SEQ ID NO: 30 | moltype = DNA length = 396 |
| --- | --- |
| FEATURE | Location/Qualifiers |
| source | 1..396 |
| | mol_type = other DNA |
| | organism = synthetic construct |
| SEQUENCE: 30 | |

```
atcatctcct tctttcttgc gctgacgtcg actgcgttgc tcttcctgct gttcttcctc   60
acgctccgtt tctctgttgt taaacggggc agaaagaaac tcctgtatat attcaaacaa  120
ccatttatga gaaaagtctt cttgagatgc atcaattatg tcttctttcc atcacttaaa  180
ccttcttcca gtatagatga gtatttctct gaacagccat tgaagaatct tctgctttca  240
acttctgagg aacaaatcga aagatgtttc ataattgaaa atataagcac aattgctaca  300
gtagaagaaa ctaatcaaac tccagtacaa actactcaag aggaagatgg ctgtagctgc  360
cgatttccag aagaagaaga aggaggatgt gaactg                            396
```